(12) United States Patent
Liu et al.

(10) Patent No.: US 12,520,300 B2
(45) Date of Patent: Jan. 6, 2026

(54) TERMINAL APPARATUS, BASE STATION APPARATUS, AND COMMUNICATION METHOD

(71) Applicant: Sharp Kabushiki Kaisha, Sakai (JP)

(72) Inventors: Liqing Liu, Sakai (JP); Shohei Yamada, Sakai (JP); Masayuki Hoshino, Sakai (JP); Hiroki Takahashi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 547 days.

(21) Appl. No.: 17/631,544

(22) PCT Filed: Aug. 11, 2020

(86) PCT No.: PCT/JP2020/030927
§ 371 (c)(1),
(2) Date: Jan. 31, 2022

(87) PCT Pub. No.: WO2021/029440
PCT Pub. Date: Feb. 18, 2021

(65) Prior Publication Data
US 2022/0279551 A1    Sep. 1, 2022

(30) Foreign Application Priority Data

Aug. 9, 2019 (JP) ................................ 2019-147908

(51) Int. Cl.
*H04W 72/1268* (2023.01)
*H04L 1/00* (2006.01)
(Continued)

(52) U.S. Cl.
CPC ....... *H04W 72/1268* (2013.01); *H04L 1/0004* (2013.01); *H04L 1/1812* (2013.01);
(Continued)

(58) Field of Classification Search
CPC ......... H04W 72/1268; H04W 72/0446; H04W 72/0453; H04W 72/23; H04W 28/18;
(Continued)

(56) References Cited

U.S. PATENT DOCUMENTS

2016/0036618 A1\* 2/2016 Einhaus ................ H04L 1/0016
370/329
2017/0373794 A1\* 12/2017 Yi ........................ H04L 1/0042
(Continued)

OTHER PUBLICATIONS

Official Communication issued in International Patent Application No. PCT/JP2020/030927, mailed on Oct. 27, 2020.
(Continued)

*Primary Examiner* — Charles N Appiah
*Assistant Examiner* — Frank E Donado
(74) *Attorney, Agent, or Firm* — Keating & Bennett, LLP

(57) ABSTRACT

A method by a user equipment (UE) is described. The method includes receiving, from a base station, a first radio resource control (RRC) parameter, monitoring a physical downlink control channel (PDCCH) with a first DCI format, receiving a transport block (TB) in a physical downlink shared channel (PDSCH) scheduled by the PDCCH with the first DCI format, wherein the first RRC parameter contains one or more MCS entries, each entry provides a modulation order and a target code rate, determining a modulation order and a target code rate used for the TB in the PDSCH at least based on a modulation code scheme (MCS) field and one, a part, or all of a plurality of specified DCI fields other than the MCS field.

9 Claims, 10 Drawing Sheets

(51) Int. Cl.
*H04L 1/1812* (2023.01)
*H04W 72/0446* (2023.01)
*H04W 72/0453* (2023.01)
*H04W 72/23* (2023.01)

(52) U.S. Cl.
CPC .............. *H04W 72/0446* (2013.01); *H04W 72/0453* (2013.01); *H04W 72/23* (2023.01)

(58) Field of Classification Search
CPC ............ H04L 1/0004; H04L 1/1812; H04L 1/0028; H04L 1/0009; H04L 1/0003; H04L 1/0016; H04L 1/0025; H04L 5/0053
See application file for complete search history.

(56) References Cited

U.S. PATENT DOCUMENTS

| | | | | |
|---|---|---|---|---|
| 2019/0190644 | A1* | 6/2019 | Ugurlu | H04L 27/2607 |
| 2020/0099467 | A1* | 3/2020 | Wang | H04L 1/0013 |
| 2021/0013991 | A1* | 1/2021 | Park | H04W 72/23 |
| 2021/0234630 | A1* | 7/2021 | Bai | H04L 1/0003 |
| 2022/0046723 | A1* | 2/2022 | Zhang | H04W 74/0833 |
| 2022/0239417 | A1* | 7/2022 | Cheng | H04L 1/1835 |

OTHER PUBLICATIONS

"3rd Generation Partnership Project; Technical Specification Group Radio Access Network; NR; Physical layer procedures for data (Release 15)", 3GPP TS 38.214 V15.6.0, Jun. 2019, pp. 1-105.

* cited by examiner

```
SearchSpace ::=                          SEQUENCE {
    searchSpaceId                        SearchSpaceId,
    controlResourceSetId                 ControlResourceSetId
    monitoringSlotPeriodicityAndOffset   CHOICE {
        ... },
    duration                             INTEGER (2..2559)
    monitoringSymbolsWithinSlot          BIT STRING (SIZE (14))
    nrofCandidates                       SEQUENCE {
        ... },
    searchSpaceType                      CHOICE {
        common                           SEQUENCE {
            dci-Format0-0-AndFormat1-0       SEQUENCE {
                ... },
            dci-Format2-0                    SEQUENCE {
                nrofCandidates-SFI               SEQUENCE {
                    ...
                    },
                ...
                },
            dci-Format2-1                    SEQUENCE {
                ...
                },
            dci-Format2-2                    SEQUENCE {
                ...
                },
            dci-Format2-3                    SEQUENCE {
                ...
                ;
            ...
            },
        ue-Specific                      SEQUENCE {
            dci-Formats                      ENUMERATED {formats0-0-And-1-0, formats0-1-And-1-1},
            ...
        }
} }
```

FIG. 2

```
SearchSpace-v16 ::=            SEQUENCE {
    searchSpaceId              SearchSpaceId,
    controlResourceSetId       ControlResourceSetId
    monitoringSlotPeriodicityAndOffset  CHOICE {
       }
    duration                   INTEGER (2..2559)
    monitoringSymbolsWithinSlot BIT STRING (SIZE (14))
    nrofCandidates             SEQUENCE {
       ...
       }
    searchSpaceType-v16        SEQUENCE {
         ue-Specific           SEQUENCE {
             dci-Formats-v16   ENUMERATED {formats0-0-And-1-0, formats0-2-And-1-2},
         ...
         }
       }
    ...
    }

SearchSpace-v16 ::=            SEQUENCE {
    searchSpaceId              SearchSpaceId,
    controlResourceSetId       ControlResourceSetId
    monitoringSlotPeriodicityAndOffset  CHOICE {
       }
    duration                   INTEGER (2..2559)
    monitoringSymbolsWithinSlot BIT STRING (SIZE (14))
    nrofCandidates             SEQUENCE {
       ...
          SEQUENCE {
             SEQUENCE {
       }
    ue-Specific-v16
         formats0-2-And-1-2
    ...
    }
```

FIG. 3

```
SearchSpace-v16 ::=              SEQUENCE {
    searchSpaceId                    SearchSpaceId,
    controlResourceSetId             ControlResourceSetId
    monitoringSlotPeriodicityAndOffset  CHOICE { ... }
    duration                         INTEGER (2..2559)
    monitoringSymbolsWithinSlot      BIT STRING (SIZE (14))
    nrofCandidates                   SEQUENCE { ... }
    searchSpaceType-v16              CHOICE {
        common                           SEQUENCE {
            dci-Format0-0-AndFormat1-0       SEQUENCE { ... }
            }
            dci-Format2-0                    SEQUENCE {
                nrofCandidates-SFI               SEQUENCE { ... }
            },
            dci-Format2-1                    SEQUENCE { ... }
            },
            dci-Format2-2                    SEQUENCE { ... }
            },
            dci-Format2-3                    SEQUENCE { ... }
            },
        ue-Specific                      SEQUENCE {
            dci-Formats                      ENUMERATED {formats0-0-And-1-0, formats0-1-And-1-1},
            ...
        },
        ue-Specific-v16                  SEQUENCE {
            formats0-2-And-1-2               SEQUENCE { ... }
            ...
        }
    ...
}
```

| MCS Index $I_{MCS}$ | Modulation Order $Q_m$ | Target code Rate R x [1024] | Spectral efficiency |
|---|---|---|---|
| 0 | 2 | 120 | 0.2344 |
| 1 | 2 | 157 | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 438 | 2.5664 |
| 18 | 6 | 466 | 2.7305 |
| 19 | 6 | 517 | 3.0293 |
| 20 | 6 | 567 | 3.3223 |
| 21 | 6 | 616 | 3.6094 |
| 22 | 6 | 666 | 3.9023 |
| 23 | 6 | 719 | 4.2129 |
| 24 | 6 | 772 | 4.5234 |
| 25 | 6 | 822 | 4.8164 |
| 26 | 6 | 873 | 5.1152 |
| 27 | 6 | 910 | 5.3320 |
| 28 | 6 | 948 | 5.5547 |
| 29 | 2 | reserved | |
| 30 | 4 | reserved | |
| 31 | 6 | reserved | |

| MCS Index $I_{MCS}$ | Modulation Order $Q_m$ | Target code Rate $R$ x [1024] | Spectral efficiency |
|---|---|---|---|
| 0 | 2 | 120 | 0.2344 |
| 1 | 2 | 157 | 0.3066 |
| 2 | 2 | 308 | 0.6016 |
| 3 | 2 | 379 | 0.7402 |
| 4 | 4 | 340 | 1.3281 |
| 5 | 4 | 378 | 1.4766 |
| 6 | 6 | 438 | 2.5664 |
| 7 | 6 | 567 | 3.3223 |

704 {

| MCS Index $I_{MCS}$ | Modulation Order $Q_m$ | Target code Rate $R$ x [1024] | Spectral efficiency |
|---|---|---|---|
| 0 | 2 | 120 | 0.2344 |
| 1 | 2 | 157 | 0.3066 |
| 2 | 2 | 308 | 0.6016 |
| 3 | 2 | 379 | 0.7402 |
| 4 | 4 | 340 | 1.3281 |
| 5 | 2 | reserved | |
| 6 | 4 | reserved | |
| 7 | 6 | reserved | |

706 {

| MCS Index $I_{MCS}$ | Modulation Order $Q_m$ | Target code Rate $R$ x [1024] | Spectral efficiency |
|---|---|---|---|
| 0 | 2 | reserved | |
| 1 | 4 | reserved | |
| 2 | 6 | reserved | |
| 3 | 2 | 379 | 0.7402 |
| 4 | 4 | 340 | 1.3281 |
| 5 | 4 | 378 | 1.4766 |
| 6 | 6 | 438 | 2.5664 |
| 7 | 6 | 567 | 3.3223 |

TERMINAL APPARATUS, BASE STATION APPARATUS, AND COMMUNICATION METHOD

TECHNICAL FIELD

The present disclosure relates to a terminal apparatus, a base station apparatus, a communication method, and an integrated circuit.

BACKGROUND

At present, as a radio access system and a radio network technology aimed for the fifth generation cellular system, technical investigation and standard development are being conducted, as extended standards of Long Term Evolution (LTE), on LTE-Advanced Pro (LTE-A Pro) and New Radio technology (NR) in The Third Generation Partnership Project (3GPP).

In the fifth generation cellular system, three services of enhanced Mobile BroadBand (eMBB) to achieve high-speed and large-volume transmission, Ultra-Reliable and Low Latency Communication (URLLC) to achieve low-latency and high-reliability communication, and massive Machine Type Communication (mMTC) to allow connection of a large number of machine type devices such as Internet of Things (IoT) have been demanded as assumed scenarios.

For example, wireless communication devices may communicate with one or more devices for multiple service types. However, current existing systems and methods may only offer limited flexibility and efficiency for multiple service communication. As illustrated by this discussion, systems and methods according to the prevent invention, supporting an MCS field with variable bits, may improve communication reliability and efficiency and may be beneficial.

BRIEF DESCRIPTION OF THE DRAWINGS

FIG. 2 is a diagram illustrating a RRC parameter SearchSpace with an information element structure A 200;

FIG. 3 is a diagram illustrating a RRC parameter SearchSpace-v16 with an information element structure B 300;

FIG. 4 is a diagram illustrating a RRC parameter SearchSpace-v16 with an information element structure C 400;

FIG. 5 is a diagram illustrating one example of MCS index table 500.

FIG. 7 is a diagram illustrating one example of configured MCS index table by RRC parameter 700.

DESCRIPTION OF EMBODIMENTS

Figure 1:
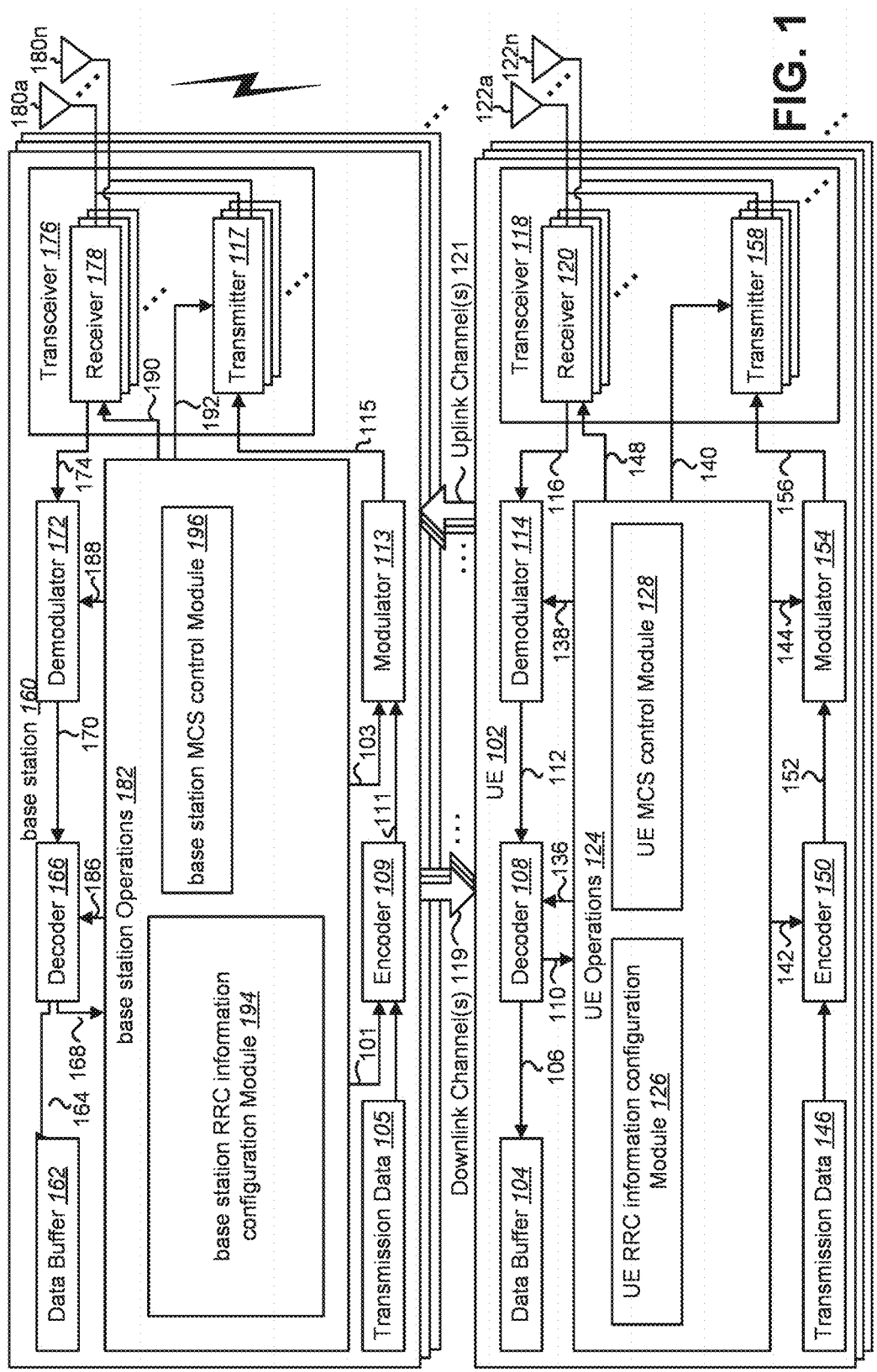
FIG. 1 is a block diagram illustrating one configuration of one or more base stations and one or more user equipments (UEs) in which systems and methods for search space configuration and/or DCI alignment may be implemented.

A method by a user equipment (UE) is described. The method includes receiving, from a base station, a first radio resource control (RRC) parameter, monitoring a physical downlink control channel (PDCCH) with a first DCI format, receiving a transport block (TB) in a physical downlink shared channel (PDSCH) scheduled by the PDCCH with the first DCI format, wherein the first RRC parameter contains one or more MCS entries, each entry provides a modulation order and a target code rate, determining a modulation order and a target code rate used for the TB in the PDSCH at least based on a modulation and coding scheme (MCS) field and one, a part, or all of a plurality of specified DCI fields other than the MCS field. The specified DCI fields include one, a part, or all of a HARQ process number field, a New data indicator (NDI) field, a time domain resource assignment field, and a frequency domain resource assignment field. In a first case that the PDSCH is determined as an initial transmission of the TB based on the NDI field of the first DCI format, the modulation order and the target code rate are determined as X-th MCS entry in the first RRC parameter, the determined code rate is at least used to determine the transport block size for the TB. In a second case that the PDSCH is determined as a retransmission of the TB based on the NDI field of the first DCI format, the modulation order is determined as X-th MCS entry in the first RRC parameter, the target code rate provided in the X-th MCS entry is not used for the TB in the PDSCH. The value of X is indicated by the MCS field.

A method by a base station is described. The method includes transmitting, to a user equipment (UE), a first radio resource control (RRC) parameter, wherein the first RRC parameter contains one or more MCS entries, each entry provides a modulation order and a target code rate, determining a modulation order and a target code rate used for a transport block (TB) at least based on the first RRC parameter and one, a part, or all of a plurality of specified DCI fields other than a modulation and coding scheme (MCS) field, generate the MCS field with an MCS index indicating the determined modulation order and the target code rate, further transmitting a physical downlink control channel (PDCCH) with a first DCI format including the generated MCS field, to transmit the TB in a physical downlink shared channel (PDSCH) scheduled by the PDCCH with the first DCI format. The specified DCI fields include one, a part, or all of a HARQ process number field, a New data indicator (NDI) field, a time domain resource assignment field, and a frequency domain resource assignment field. In a first case that the PDSCH is determined as an initial transmission of the TB based on the NDI field of the first DCI format, the modulation order and the target code rate are determined as X-th MCS entry in the first RRC parameter, the determined code rate is at least used to determine the transport block size for the TB. In a second case that the PDSCH is determined as a retransmission of the TB based on the NDI field of the first DCI format, the modulation order is determined as X-th MCS entry in the first RRC parameter, the target code rate provided in the X-th MCS entry is not used for the TB in the PDSCH. The value of X is indicated by the MCS field.

A user equipment (UE) is described. The UE includes reception circuitry configured to receive, from a base station, a first radio resource control (RRC) parameter, to monitor a physical downlink control channel (PDCCH) with a first DCI format, to receive a transport block (TB) in a physical downlink shared channel (PDSCH) scheduled by the PDCCH with the first DCI format, wherein the first RRC parameter contains one or more MCS entries, each entry provides a modulation order and a target code rate, control circuitry configured to determine a modulation order and a target code rate used for the TB in the PDSCH at least based on a modulation and coding scheme (MCS) field and one, a part, or all of a plurality of specified DCI fields other than the MCS field. The specified DCI fields include one, a part, or all of a HARQ process number field, a New data indicator (NDI) field, a time domain resource assignment field, and a frequency domain resource assignment field. In a first case that the PDSCH is determined as an initial transmission of the TB based on the NDI field of the first DCI format, the modulation order and the target code rate are determined as X-th MCS entry in the first RRC parameter, the determined code rate is at least used to determine the transport block size for the TB. In a second case that the PDSCH is determined as a retransmission of the TB based on the NDI field of the first DCI format, the modulation order is determined as X-th MCS entry in the first RRC parameter, the target code rate provided in the X-th MCS entry is not used for the TB in the PDSCH. The value of X is indicated by the MCS field.

A base station is described. The base station includes transmission circuitry configured to transmit, to a user equipment (UE), a first radio resource control (RRC) parameter, wherein the first RRC parameter contains one or more MCS entries, each entry provides a modulation order and a target code rate, control circuitry configured to determine a modulation order and a target code rate used for a transport block (TB) at least based on the first RRC parameter and one, a part, or all of a plurality of specified DCI fields other than a modulation and coding scheme (MCS) field, generate the MCS field with an MCS index indicating the determined modulation order and the target code rate, transmission circuitry configured to further transmit a physical downlink control channel (PDCCH) with a first DCI format including the generated MCS field, to transmit the TB in a physical downlink shared channel (PDSCH) scheduled by the PDCCH with the first DCI format. The specified DCI fields include one, a part, or all of a HARQ process number field, a New data indicator (NDI) field, a time domain resource assignment field, and a frequency domain resource assignment field. In a first case that the PDSCH is determined as an initial transmission of the TB based on the NDI field of the first DCI format, the modulation order and the target code rate are determined as X-th MCS entry in the first RRC parameter, the determined code rate is at least used to determine the transport block size for the TB. In a second case that the PDSCH is determined as a retransmission of the TB based on the NDI field of the first DCI format, the modulation order is determined as X-th MCS entry in the first RRC parameter, the target code rate provided in the X-th MCS entry is not used for the TB in the PDSCH. The value of X is indicated by the MCS field.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN). 3GPP NR (New Radio) is the name given to a project to improve the LTE mobile phone or device standard to cope with future requirements. In one aspect, LTE has been modified to provide support and specification (TS 38.331, 38.321, 38.300, 37.300, 38.211, 38.212, 38.213, 38.214, etc) for the New Radio Access (NR) and Next generation-Radio Access Network (NG-RAN).

At least some aspects of the systems and methods disclosed herein may be described in relation to the 3GPP LTE, LTE-Advanced (LTE-A), LTE-Advanced Pro, New Radio Access (NR), and other 3G/4G/5G standards (e.g., 3GPP Releases 8, 9, 10, 11, 12, 13, 14, and/or 15, and/or Narrow Band-Internet of Things (NB-IoT)). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a UE (User Equipment), an access terminal, a subscriber station, a mobile terminal, a remote station, a user terminal, a terminal, a subscriber unit, a mobile device, a relay node, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device."

In 3GPP specifications, a base station is typically referred to as a gNB, a Node B, an eNB, a home enhanced or evolved Node B (HeNB) or some other similar terminology. As the scope of the disclosure should not be limited to 3GPP standards, the terms "base station,", "gNB", "Node B," "eNB," and "HeNB" may be used interchangeably herein to mean the more general term "base station." Furthermore, one example of a "base station" is an access point. An access point may be an electronic device that provides access to a network (e.g., Local Area Network (LAN), the Internet, etc.) for wireless communication devices. The term "communication device" may be used to denote both a wireless communication device and/or a base station.

It should be noted that as used herein, a "cell" may be any communication channel that is specified by standardization or regulatory bodies to be used for International Mobile Telecommunications-Advanced (IMT-Advanced), IMT-2020 (5G) and all of it or a subset of it may be adopted by 3GPP as licensed bands (e.g., frequency bands) to be used for communication between a base station and a UE. It should also be noted that in NR, NG-RAN, E-UTRA and E-UTRAN overall description, as used herein, a "cell" may be defined as "combination of downlink and optionally uplink resources." The linking between the carrier frequency of the downlink resources and the carrier frequency of the uplink resources may be indicated in the system information transmitted on the downlink resources.

"Configured cells" are those cells of which the UE is aware and is allowed by a base station to transmit or receive information. "Configured cell(s)" may be serving cell(s). The UE may receive system information and perform the required measurements on configured cells. "Configured cell(s)" for a radio connection may consist of a primary cell and/or no, one, or more secondary cell(s). "Activated cells" are those configured cells on which the UE is transmitting and receiving. That is, activated cells are those cells for which the UE monitors the physical downlink control channel (PDCCH) and in the case of a downlink transmission, those cells for which the UE decodes a physical downlink shared channel (PDSCH). "Deactivated cells" are those configured cells that the UE is not monitoring the transmission PDCCH. It should be noted that a "cell" may be described in terms of differing dimensions. For example, a "cell" may have temporal, spatial (e.g., geographical) and frequency characteristics.

The base stations may be connected by the NG interface to the 5G-core network (5G-CN). 5G-CN may be called as to NextGen core (NGC), or 5G core (5GC). The base stations may also be connected by the S1 interface to the evolved packet core (EPC). For instance, the base stations may be connected to a NextGen (NG) mobility management function by the NG-2 interface and to the NG core User Plane (UP) functions by the NG-3 interface. The NG interface supports a many-to-many relation between NG mobility management functions, NG core UP functions and the base stations. The NG-2 interface is the NG interface for the control plane and the NG-3 interface is the NG interface for the user plane. For instance, for EPC connection, the base stations may be connected to a mobility management entity (MME) by the S1-MME interface and to the serving gateway (S-GW) by the S1-U interface. The S1 interface supports a many-to-many relation between MMEs, serving gateways and the base stations. The S1-MME interface is the S1 interface for the control plane and the S1-U interface is the S1 interface for the user plane. The Uu interface is a radio interface between the UE and the base station for the radio protocol.

The radio protocol architecture may include the user plane and the control plane. The user plane protocol stack may include packet data convergence protocol (PDCP), radio link control (RLC), medium access control (MAC) and physical (PHY) layers. A DRB (Data Radio Bearer) is a radio bearer that carries user data (as opposed to control plane signaling). For example, a DRB may be mapped to the user plane protocol stack. The PDCP, RLC, MAC and PHY sublayers (terminated at the base station 460a on the network) may perform functions (e.g., header compression, ciphering, scheduling, ARQ and HARQ) for the user plane. PDCP entities are located in the PDCP sublayer. RLC entities may be located in the RLC sublayer. MAC entities may be located in the MAC sublayer. The PHY entities may be located in the PHY sublayer.

The control plane may include a control plane protocol stack. The PDCP sublayer (terminated in base station on the network side) may perform functions (e.g., ciphering and integrity protection) for the control plane. The RLC and MAC sublayers (terminated in base station on the network side) may perform the same functions as for the user plane. The Radio Resource Control (RRC) (terminated in base station on the network side) may perform the following functions. The RRC may perform broadcast functions, paging, RRC connection management, radio bearer (RB) control, mobility functions, UE measurement reporting and control. The Non-Access Stratum (NAS) control protocol (terminated in MME on the network side) may perform, among other things, evolved packet system (EPS) bearer management, authentication, evolved packet system connection management (ECM)-IDLE mobility handling, paging origination in ECM-IDLE and security control.

Signaling Radio Bearers (SRBs) are Radio Bearers (RB) that may be used only for the transmission of RRC and NAS messages. Three SRBs may be defined. SRB0 may be used for RRC messages using the common control channel (CCCH) logical channel. SRB1 may be used for RRC messages (which may include a piggybacked NAS message) as well as for NAS messages prior to the establishment of SRB2, all using the dedicated control channel (DCCH) logical channel. SRB2 may be used for RRC messages which include logged measurement information as well as for NAS messages, all using the DCCH logical channel. SRB2 has a lower-priority than SRB1 and may be configured by a network (e.g., base station) after security activation. A broadcast control channel (BCCH) logical channel may be used for broadcasting system information. Some of BCCH logical channel may convey system information which may be sent from the network to the UE via BCH (Broadcast Channel) transport channel. BCH may be sent on a physical broadcast channel (PBCH). Some of BCCH logical channel may convey system information which may be sent from the network to the UE via DL-SCH (Downlink Shared Channel) transport channel. Paging may be provided by using paging control channel (PCCH) logical channel.

For example, the DL-DCCH logical channel may be used (but not limited to) for a RRC reconfiguration message, a RRC reestablishment message, a RRC release, a UE Capability Enquiry message, a DL Information Transfer message or a Security Mode Command message. UL-DCCH logical channel may be used (but not limited to) for a measurement report message, a RRC Reconfiguration Complete message, a RRC Reestablishment Complete message, a RRC Setup Complete message, a Security Mode Complete message, a Security Mode Failure message, a UE Capability Information, message, a UL Handover Preparation Transfer message, a UL Information Transfer message, a Counter Check Response message, a UE Information Response message, a Proximity Indication message, a RN (Relay Node) Reconfiguration Complete message, an MBMS Counting Response message, an inter Frequency RSTD Measurement Indication message, a UE Assistance Information message, an In-device Coexistence Indication message, an MBMS Interest Indication message, an SCG Failure Information message. DL-CCCH logical channel may be used (but not limited to) for a RRC Connection Reestablishment message, a RRC Reestablishment Reject message, a RRC Reject message, or a RRC Setup message. UL-CCCH logical channel may be used (but not limited to) for a RRC Reestablishment Request message, or a RRC Setup Request message.

System information may be divided into the MasterInformationBlock (MIB) and a number of SystemInformationBlocks (SIBs).

The UE may receive one or more RRC messages from the base station to obtain RRC configurations or parameters. The RRC layer of the UE may configure RRC layer and/or lower layers (e.g., PHY layer, MAC layer, RLC layer, PDCP layer) of the UE according to the RRC configurations or parameters which may be configured by the RRC messages, broadcasted system information, and so on. The base station may transmit one or more RRC messages to the UE to cause the UE to configure RRC layer and/or lower layers of the UE according to the RRC configurations or parameters which may be configured by the RRC messages, broadcasted system information, and so on.

When carrier aggregation is configured, the UE may have one RRC connection with the network. One radio interface may provide carrier aggregation. During RRC establishment, re-establishment and handover, one serving cell may provide Non-Access Stratum (NAS) mobility information (e.g., a tracking area identity (TAI)). During RRC re-establishment and handover, one serving cell may provide a security input. This cell may be referred to as the primary cell (PCell). In the downlink, the component carrier corresponding to the PCell may be the downlink primary component carrier (DL PCC), while in the uplink it may be the uplink primary component carrier (UL PCC).

Depending on UE capabilities, one or more SCells may be configured to form together with the PCell a set of serving cells. In the downlink, the component carrier corresponding to an SCell may be a downlink secondary component carrier (DL SCC), while in the uplink it may be an uplink secondary component carrier (UL SCC).

The configured set of serving cells for the UE, therefore, may consist of one PCell and one or more SCells. For each SCell, the usage of uplink resources by the UE (in addition to the downlink resources) may be configurable. The number of DL SCCs configured may be larger than or equal to the number of UL SCCs and no SCell may be configured for usage of uplink resources only.

From a UE viewpoint, each uplink resource may belong to one serving cell. The number of serving cells that may be configured depends on the aggregation capability of the UE. The PCell may only be changed using a handover procedure (e.g., with a security key change and a random access procedure). A PCell may be used for transmission of the PUCCH. A primary secondary cell (PSCell) may also be used for transmission of the PUCCH. The PSCell may be referred to as a primary SCG cell or SpCell of a secondary cell group. The PCell or PSCell may not be de-activated. Re-establishment may be triggered when the PCell experiences radio link failure (RLF), not when the SCells experience RLF. Furthermore, NAS information may be taken from the PCell.

The reconfiguration, addition and removal of SCells may be performed by RRC. At handover or reconfiguration with sync, Radio Resource Control (RRC) layer may also add, remove or reconfigure SCells for usage with a target PCell. When adding a new SCell, dedicated RRC signaling may be used for sending all required system information of the SCell (e.g., while in connected mode, UEs need not acquire broadcasted system information directly from the SCells).

The systems and methods described herein may enhance the efficient use of radio resources in Carrier aggregation (CA) operation. Carrier aggregation refers to the concurrent utilization of more than one component carrier (CC). In carrier aggregation, more than one cell may be aggregated to a UE. In one example, carrier aggregation may be used to increase the effective bandwidth available to a UE. In traditional carrier aggregation, a single base station is assumed to provide multiple serving cells for a UE. Even in scenarios where two or more cells may be aggregated (e.g., a macro cell aggregated with remote radio head (RRH) cells) the cells may be controlled (e.g., scheduled) by a single base station.

The systems and methods described herein may enhance the efficient use of radio resources in Carrier aggregation operation. Carrier aggregation refers to the concurrent utilization of more than one component carrier (CC). In carrier aggregation, more than one cell may be aggregated to a UE. In one example, carrier aggregation may be used to increase the effective bandwidth available to a UE. In traditional carrier aggregation, a single base station is assumed to provide multiple serving cells for a UE. Even in scenarios where two or more cells may be aggregated (e.g., a macro cell aggregated with remote radio head (RRH) cells) the cells may be controlled (e.g., scheduled) by a single base station. However, in a small cell deployment scenario, each node (e.g., base station, RRH, etc.) may have its own independent scheduler. To maximize the efficiency of radio resources utilization of both nodes, a UE may connect to two or more nodes that have different schedulers. The systems and methods described herein may enhance the efficient use of radio resources in dual connectivity operation. A UE may be configured multiple groups of serving cells, where each group may have carrier aggregation operation (e.g., if the group includes more than one serving cell).

In Dual Connectivity (DC) the UE may be required to be capable of UL-CA with simultaneous PUCCH/PUCCH and PUCCH/PUSCH transmissions across cell-groups (CGs). In a small cell deployment scenario, each node (e.g., eNB, RRH, etc.) may have its own independent scheduler. To maximize the efficiency of radio resources utilization of both nodes, a UE may connect to two or more nodes that have different schedulers. A UE may be configured multiple groups of serving cells, where each group may have carrier aggregation operation (e.g., if the group includes more than one serving cell). A UE in RRC_CONNECTED may be configured with Dual Connectivity or MR-DC, when configured with a Master and a Secondary Cell Group. A Cell Group (CG) may be a subset of the serving cells of a UE, configured with Dual Connectivity (DC) or MR-DC, i.e. a Master Cell Group (MCG) or a Secondary Cell Group (SCG). The Master Cell Group may be a group of serving cells of a UE comprising of the PCell and zero or more secondary cells. The Secondary Cell Group (SCG) may be a group of secondary cells of a UE, configured with DC or MR-DC, comprising of the PSCell and zero or more other secondary cells. A Primary Secondary Cell (PSCell) may be the SCG cell in which the UE is instructed to perform random access when performing the SCG change procedure. "PSCell" may be also called as a Primary SCG Cell. In Dual Connectivity or MR-DC, two MAC entities may be configured in the UE: one for the MCG and one for the SCG. Each MAC entity may be configured by RRC with a serving cell supporting PUCCH transmission and contention based Random Access. In a MAC layer, the term Special Cell (SpCell) may refer to such cell, whereas the term SCell may refer to other serving cells. The term SpCell either may refer to the PCell of the MCG or the PSCell of the SCG depending on if the MAC entity is associated to the MCG or the SCG, respectively. A Timing Advance Group (TAG) containing the SpCell of a MAC entity may be referred to as primary TAG (pTAG), whereas the term secondary TAG (sTAG) refers to other TAGs.

DC may be further enhanced to support Multi-RAT Dual Connectivity (MR-DC). MR-DC may be a generalization of the Intra-E-UTRA Dual Connectivity (DC) described in 36.300, where a multiple Rx/Tx UE may be configured to utilize resources provided by two different nodes connected via non-ideal backhaul, one providing E-UTRA access and the other one providing NR access. One node acts as a Mater Node (MN) and the other as a Secondary Node (SN). The MN and SN are connected via a network interface and at least the MN is connected to the core network. In DC, a PSCell may be a primary secondary cell. In EN-DC, a PSCell may be a primary SCG cell or SpCell of a secondary cell group.

E-UTRAN may support MR-DC via E-UTRA-NR Dual Connectivity (EN-DC), in which a UE is connected to one eNB that acts as a MN and one en-gNB that acts as a SN. The en-gNB is a node providing NR user plane and control plane protocol terminations towards the UE, and acting as Secondary Node in EN-DC. The eNB is connected to the EPC via the S1 interface and to the en-gNB via the X2 interface. The en-gNB might also be connected to the EPC via the S1-U interface and other en-gNBs via the X2-U interface.

A timer is running once it is started, until it is stopped or until it expires; otherwise it is not running. A timer can be started if it is not running or restarted if it is running. A Timer may be always started or restarted from its initial value.

For NR, a technology of aggregating NR carriers may be studied. Both lower layer aggregation like Carrier Aggregation (CA) for LTE and upper layer aggregation like DC are investigated. From layer 2/3 point of view, aggregation of carriers with different numerologies may be supported in NR.

The main services and functions of the RRC sublayer may include the following:

Broadcast of System Information related to Access Stratum (AS) and Non Access Stratum (NAS);
Paging initiated by CN or RAN;
Establishment, maintenance and release of an RRC connection between the UE and NR RAN including:
Addition, modification and release of carrier aggregation;
Addition, modification and release of Dual Connectivity in NR or between LTE and NR;
Security functions including key management;
Establishment, configuration, maintenance and release of signaling radio bearers and data radio bearers;
Mobility functions including:
Handover;
UE cell selection and reselection and control of cell selection and reselection;
Context transfer at handover.
QoS management functions;
UE measurement reporting and control of the reporting;
NAS message transfer to/from NAS from/to UE.

Each MAC entity of a UE may be configured by RRC with a Discontinuous Reception (DRX) functionality that controls the UE's PDCCH monitoring activity for the MAC entity's C-RNTI (Radio Network Temporary Identifier), CS-RNTI, INT-RNTI, SFI-RNTI, SP-CSI-RNTI, TPC-PUCCH-RNTI, TPC-PUSCH-RNTI, and TPC-SRS-RNTI. For scheduling at cell level, the following identities are used:

C (Cell)-RNTI: unique UE identification used as an identifier of the RRC Connection and for scheduling;
CS (Configured Scheduling)-RNTI: unique UE identification used for Semi-Persistent Scheduling in the downlink;
INT-RNTI: identification of pre-emption in the downlink;
P-RNTI: identification of Paging and System Information change notification in the downlink;
SI-RNTI: identification of Broadcast and System Information in the downlink;
SP-CSI-RNTI: unique UE identification used for semi-persistent CSI reporting on PUSCH;

For power and slot format control, the following identities are used:

SFI-RNTI: identification of slot format;
TPC-PUCCH-RNTI: unique UE identification to control the power of PUCCH;
TPC-PUSCH-RNTI: unique UE identification to control the power of PUSCH;
TPC-SRS-RNTI: unique UE identification to control the power of SRS;

During the random access procedure, the following identities are also used:

RA-RNTI: identification of the Random Access Response in the downlink;
Temporary C-RNTI: UE identification temporarily used for scheduling during the random access procedure;
Random value for contention resolution: UE identification temporarily used for contention resolution purposes during the random access procedure.

For NR connected to 5GC, the following UE identities are used at NG-RAN level:

I-RNTI: used to identify the UE context in RRC_INACTIVE.

The size of various fields in the time domain is expressed in time units $T_c=1/(\Delta f_{max} \cdot N_f)$ where $\Delta f_{max}=480 \cdot 10^3$ Hz and $N_f=4096$. The constant $\kappa=T_s/T_c=64$ where $T_s=1/(\Delta f_{ref} \cdot N_{f,ref})$, $\Delta f_{ref}=15 \cdot 10^3$ Hz and $N_{f,ref}=2048$.

Multiple OFDM numerologies are supported as given by Table 4.2-1 of [TS 38.211] where μ and the cyclic prefix for a bandwidth part are obtained from the higher-layer parameter subcarrierSpacing and cyclicPrefix, respectively.

The size of various fields in the time domain may be expressed as a number of time units $T_s=1/(15000 \times 2048)$ seconds. Downlink and uplink transmissions are organized into frames with $T_f=(\Delta f_{max} N_f/100) \cdot T_c=10$ ms duration, each consisting of ten subframes of $T_{sf}=(\Delta f_{max} N_f/1000) \cdot T_c=1$ ms duration. The number of consecutive OFDM symbols per subframe is $N_{symb}^{subframe,\mu}=N_{symb}^{slot} N_{slot}^{subframe,\mu}$. Each frame is divided into two equally-sized half-frames of five subframes each with half-frame 0 consisting of subframes 0-4 and half-frame 1 consisting of subframes 5-9.

For subcarrier spacing configuration μ, slots are numbered $n_s^\mu \in \{0, \ldots, N_{slot}^{subframe,\mu}-1\}$ in increasing order within a subframe and $n_{s,f}^\mu \in \{0, \ldots, N_{slot}^{frame,\mu}-1\}$ in increasing order within a frame. $N_{slot}^{subframe,\mu}$ is the number of slots per subframe for subcarrier spacing configuration μ. There are $N_{symb}^{slot}$ consecutive OFDM symbols in a slot where $N_{symb}^{slot}$ depends on the cyclic prefix as given by Tables 4.3.2-1 and 4.3.2-2 of [TS 38.211]. The start of slot $n_s^\mu$ in a subframe is aligned in time with the start of OFDM symbol $n_s^\mu N_{symb}^{slot}$ in the same subframe.

OFDM symbols in a slot can be classified as 'downlink', 'flexible', or 'uplink'. Signaling of slot formats is described in subclause 11.1 of [TS 38.213].

In a slot in a downlink frame, the UE may assume that downlink transmissions only occur in 'downlink' or 'flexible' symbols. In a slot in an uplink frame, the UE may only transmit in 'uplink' or 'flexible' symbols.

Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope, as claimed, but is merely representative of the systems and methods.

FIG. 1 is a block diagram illustrating one configuration of one or more base stations 160 (e.g., eNB, gNB) and one or more user equipments (UEs) 102 in which systems and methods for search space configuration (or search for PDCCH candidates) and/or DCI size alignment may be implemented. The one or more UEs 102 may communicate with one or more base stations 160 using one or more antennas 122a-n. For example, a UE 102 transmits electromagnetic signals to the base station 160 and receives electromagnetic signals from the base station 160 using the one or more antennas 122a-n. The base station 160 communicates with the UE 102 using one or more antennas 180a-n.

It should be noted that in some configurations, one or more of the UEs 102 described herein may be implemented in a single device. For example, multiple UEs 102 may be combined into a single device in some implementations. Additionally or alternatively, in some configurations, one or more of the base stations 160 described herein may be implemented in a single device. For example, multiple base stations 160 may be combined into a single device in some implementations. In the context of FIG. 1, for instance, a single device may include one or more UEs 102 in accordance with the systems and methods described herein. Additionally or alternatively, one or more base stations 160 in accordance with the systems and methods described herein may be implemented as a single device or multiple devices.

The UE 102 and the base station 160 may use one or more channels 119, 121 to communicate with each other. For example, a UE 102 may transmit information or data to the base station 160 using one or more uplink (UL) channels 121 and signals. Examples of uplink channels 121 include a physical uplink control channel (PUCCH) and a physical uplink shared channel (PUSCH), etc. Examples of uplink signals include a demodulation reference signal (DMRS) and a sounding reference signal (SRS), etc. The one or more base stations 160 may also transmit information or data to the one or more UEs 102 using one or more downlink (DL) channels 119 and signals, for instance. Examples of downlink channels 119 include a PDCCH, a PDSCH, etc. Examples of downlink signals include a primary synchronization signal (PSS), a secondary synchronization signal (SSS), a cell-specific reference signal (CRS), a non-zero power channel state information reference signal (NZP CSI-RS), and a zero power channel state information reference signal (ZP CSI-RS), etc. Other kinds of channels or signals may be used.

Each of the one or more UEs 102 may include one or more transceivers 118, one or more demodulators 114, one or more decoders 108, one or more encoders 150, one or more modulators 154, one or more data buffers 104 and one or more UE operations modules 124. For example, one or more reception and/or transmission paths may be implemented in the UE 102. For convenience, only a single transceiver 118, decoder 108, demodulator 114, encoder 150 and modulator 154 are illustrated in the UE 102, though multiple parallel elements (e.g., transceivers 118, decoders 108, demodulators 114, encoders 150 and modulators 154) may be implemented.

The transceiver 118 may include one or more receivers 120 and one or more transmitters 158. The one or more receivers 120 may receive signals (e.g., downlink channels, downlink signals) from the base station 160 using one or more antennas 122a-n. For example, the receiver 120 may receive and downconvert signals to produce one or more received signals 116. The one or more received signals 116 may be provided to a demodulator 114. The one or more transmitters 158 may transmit signals (e.g., uplink channels, uplink signals) to the base station 160 using one or more antennas 122a-n. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce one or more decoded signals 106, 110. For example, a first UE-decoded signal 106 may comprise received payload data, which may be stored in a data buffer 104. A second UE-decoded signal 110 may comprise overhead data and/or control data. For example, the second UE-decoded signal 110 may provide data that may be used by the UE operations module 124 to perform one or more operations.

As used herein, the term "module" may mean that a particular element or component may be implemented in hardware, software or a combination of hardware and software. However, it should be noted that any element denoted as a "module" herein may alternatively be implemented in hardware. For example, the UE operations module 124 may be implemented in hardware, software or a combination of both.

In general, the UE operations module 124 may enable the UE 102 to communicate with the one or more base stations 160. The UE operations module 124 may include a UE RRC information configuration module 126. The UE operations module 124 may include a UE MCS control module 128. In some implementations, the UE operations module 124 may include physical (PHY) entities, Medium Access Control (MAC) entities, Radio Link Control (RLC) entities, packet data convergence protocol (PDCP) entities, and an Radio Resource Control (RRC) entity. For example, the UE RRC information configuration module 126 may process one or more RRC parameters for MCS configuration. The UE RRC information configuration module 126 may provide RRC configured MCS configuration and one or more predefined MCS index tables. The UE decoder 108 may provide the DCI fields information (e.g. a MCS field, a HARQ process number field, a New data indicator field, a time domain resource assignment field, and/or a frequency domain resource assignment field) to the UE MCS control module 128 after processing a DCI format. The UE DCI control module 128 may further determine an MCS field size for a DCI format. The UE MCS control module 128 may determine a modulation order and/or a target code rate based on the processing output from the UE RRC information configuration module 126 and the processing output from the UE decoder 108. The UE MCS control module 128 may further determine a TBS for transport block based on the determined modulation order and the determined target code rate.

The UE operations module 124 may provide the benefit of receiving DCI formats efficiently and reliably by determining the bit width of the MCS field for different DCI formats.

The UE operations module 124 may provide information 148 to the one or more receivers 120. For example, the UE operations module 124 may inform the receiver(s) 120 when or when not to receive transmissions based on the Radio Resource Control (RRC) message (e.g., broadcasted system information, RRC reconfiguration message), MAC control element, and/oi the DCI (Downlink Control Information). The UE operations module 124 may provide information 148, including the PDCCH monitoring occasions and DCI format size, to the one or more receivers 120. The UE operation module 124 may inform the receiver(s) 120 when or where to receive/monitor the PDCCH candidate for DCI formats with which DCI size.

The UE operations module 124 may provide information 138 to the demodulator 114. For example, the UE operations module 124 may inform the demodulator 114 of a modulation pattern anticipated for transmissions from the base station 160. For example, the UE operations module 124 may inform the demodulator 114 of a determined modulation order and/or a determined target code rate anticipated for transmissions of a transport block from the base station 160.

The UE operations module 124 may provide information 136 to the decoder 108. For example, the UE operations module 124 may inform the decoder 108 of an anticipated encoding for transmissions from the base station 160. For example, the UE operations module 124 may inform the modulator 154 of a determined modulation order and/or a determined target code rate anticipated for transmissions of a transport block to the base station 160.

The UE operations module 124 may provide information 142 to the encoder 150. The information 142 may include data to be encoded and/or instructions for encoding. For example, the UE operations module 124 may instruct the encoder 150 to encode transmission data 146 and/or other information 142.

The encoder 150 may encode transmission data 146 and/or other information 142 provided by the UE operations module 124. For example, encoding the data 146 and/or other information 142 may involve error detection and/or correction coding, mapping data to space, time and/or frequency resources for transmission, multiplexing, etc. The encoder 150 may provide encoded data 152 to the modulator 154.

The UE operations module 124 may provide information 144 to the modulator 154. For example, the UE operations module 124 may inform the modulator 154 of a modulation type (e.g., constellation mapping) to be used for transmissions to the base station 160. The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158. For example, the UE operations module 124 may instruct the one or more transmitters 158 when to transmit a signal to the base station 160. The one or more transmitters 158 may upconvert and transmit the modulated signal(s) 156 to one or more base stations 160.

The base station 160 may include one or more transceivers 176, one or more demodulators 172, one or more decoders 166, one or more encoders 109, one or more modulators 113, one or more data buffers 162 and one or more base station operations modules 182. For example, one or more reception and/or transmission paths may be implemented in a base station 160. For convenience, only a single transceiver 176, decoder 166, demodulator 172, encoder 109 and modulator 113 are illustrated in the base station 160, though multiple parallel elements (e.g., transceivers 176, decoders 166, demodulators 172, encoders 109 and modulators 113) may be implemented.

The transceiver 176 may include one or more receivers 178 and one or more transmitters 117. The one or more receivers 178 may receive signals (e.g., uplink channels, uplink signals) from the UE 102 using one or more antennas 180*a-n*. For example, the receiver 178 may receive and downconvert signals to produce one or more received signals 174. The one or more received signals 174 may be provided to a demodulator 172. The one or more transmitters 117 may transmit signals (e.g., downlink channels, downlink signals) to the UE 102 using one or more antennas 180*a-n*. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The base station 160 may use the decoder 166 to decode signals. The decoder 166 may produce one or more decoded signals 164, 168. For example, a first base station-decoded signal 164 may comprise received payload data, which may be stored in a data buffer 162. A second base station-decoded signal 168 may comprise overhead data and/or control data. For example, the second base station-decoded signal 168 may provide data (e.g., PUSCH transmission data) that may be used by the base station operations module 182 to perform one or more operations.

In general, the base station operations module 182 may enable the base station 160 to communicate with the one or more UEs 102. The base station operations module 182 may include a base station RRC information configuration module 194. The base station operations module 182 may include a base station MCS control module 196. The base station operations module 182 may include PHY entities, MAC entities, RLC entities, PDCP entities, and an RRC entity. For example, the base station operation module 196 may determine, for UE(s), when and where to monitor or search the configured PDCCH candidates for each search space set.

The base station RRC information configuration module 194 may generate, to a UE, one or more RRC parameters for MCS configurations based on the channel state information reported by the UE. The base station MCS control module 196 may determine a modulation order and/or a target code rate and generate an MCS index in a MCS field to indicate the determined modulation order and/or the target code rate. The base station MCS control module 196 may further determine an MCS field size for a DCI format for a UE 102. The base station MCS control module 196 may further determine a TBS for transport block based on the determined modulation order and the determined target code rate.

The base station operations module 182 may provide the benefit of transmitting DCI formats efficiently and reliably by determining the bit width of the MCS field for different DCI formats.

The base station operations module 182 may provide information 190 to the one or more receivers 178. For example, the base station operations module 182 may inform the receiver(s) 178 when or when not to receive transmissions based on the RRC message (e.g., broadcasted system information, RRC reconfiguration message), MAC control element, and/or the DCI (Downlink Control Information).

The base station operations module 182 may provide information 188 to the demodulator 172. For example, the base station operations module 182 may inform the demodulator 172 of a modulation pattern anticipated for transmissions from the UE(s) 102. For example, the base station operations module 182 may inform the demodulator 172 of a determined modulation order and/or a determined target code rate anticipated for PUSCH transmissions of a transport block from the UE 102.

The base station operations module 182 may provide information 186 to the decoder 166. For example, the base station operations module 182 may inform the decoder 166 of an anticipated encoding for transmissions from the UE(s) 102. For example, the base station operations module 182 may inform the modulator 113 of a determined modulation order and/or a determined target code rate anticipated for PDSCH transmissions of a transport block to the UE 102.

The base station operations module 182 may provide information 101 to the encoder 109. The information 101 may include data to be encoded and/or instructions for encoding. For example, the base station operations module 182 may instruct the encoder 109 to encode transmission data 105 and/or other information 101.

In general, the base station operations module 182 may enable the base station 160 to communicate with one or more network nodes (e.g., a NG mobility management function, a NG core UP functions, a mobility management entity (MME), serving gateway (S-GW), gNBs). The base station operations module 182 may also generate a RRC reconfiguration message to be signaled to the UE 102.

The encoder 109 may encode transmission data 105 and/or other information 101 provided by the base station operations module 182. For example, encoding the data 105 and/or other information 101 may involve error detection and/or correction coding, mapping data to space, time and/or frequency resources for transmission, multiplexing, etc. The encoder 109 may provide encoded data 111 to the modulator 113. The transmission data 105 may include network data to be relayed to the UE 102.

The base station operations module 182 may provide information 103 to the modulator 113. This information 103 may include instructions for the modulator 113. For example, the base station operations module 182 may inform the modulator 113 of a modulation type (e.g., constellation mapping) to be used for transmissions to the UE(s) 102. The modulator 113 may modulate the encoded data 111 to provide one or more modulated signals 115 to the one or more transmitters 117.

The base station operations module 182 may provide information 192 to the one or more transmitters 117. This information 192 may include instructions for the one or more transmitters 117. For example, the base station operations module 182 may instruct the one or more transmitters 117 when to (or when not to) transmit a signal to the UE(s) 102. The base station operations module 182 may provide information 192, including the PDCCH monitoring occasions and DCI format size, to the one or more transmitters 117. The base station operation module 182 may inform the transmitter(s) 117 when or where to transmit the PDCCH candidate for DCI formats with which DCI size. The one or more transmitters 117 may upconvert and transmit the modulated signal(s) 115 to one or more UEs 102.

It should be noted that one or more of the elements or parts thereof included in the base station(s) 160 and UE(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

A base station may generate a RRC message including one or more RRC parameters, and transmit the RRC message to a UE. A UE may receive, from a base station, a RRC message including one or more RRC parameters. The term 'RRC parameter(s)' in the present disclosure may be alternatively referred to as 'RRC information element(s)'. A RRC parameter may further include one or more RRC parameter(s). In the present disclosure, a RRC message may include system information. A RRC message may include one or more RRC parameters. A RRC message may be sent on a broadcast control channel (BCCH) logical channel, a common control channel (CCCH) logical channel or a dedicated control channel (DCCH) logical channel.

Hereinafter, a description 'a base station may configure a UE to' may also imply/refer to 'a base station may transmit, to a UE, an RRC message including one or more RRC parameters'. Additionally or alternatively, 'RRC parameter configure a UE to' may also refer to 'a base station may transmit, to a UE, an RRC message including one or more RRC parameters'. Additionally or alternatively, 'a UE is configured to' may also refer to 'a UE may receive, from a base station, an RRC message including one or more RRC parameters'. Additionally or alternatively, 'a RRC parameter is (not) provided' may also refer to 'a base station may (not) transmit, to a base station, an RRC message including a RRC parameters'.

A base station may transmit a RRC message including one or more RRC parameters related to BWP configuration to a UE. A UE may receive the RRC message including one or more RRC parameters related to BWP configuration from a base station. For each cell, the base station may configure at least an initial DL BWP and one initial uplink bandwidth parts (initial UL BWP) to the UE. Furthermore, the base station may configure additional UL and DL BWPs to the UE for a cell.

A RRC parameters initialDownlinkBWP may indicate the initial downlink BWP (initial DL BWP) configuration for a serving cell (e.g., a SpCell and Scell). The base station may configure the RRC parameter locationAndBandwidth included in the initialDownlinkBWP so that the initial DL BWP contains the entire CORESET 0 of this serving cell in the frequency domain. The locationAndBandwidth may be used to indicate the frequency domain location and bandwidth of a BWP. A RRC parameters initialUplinkBWP may indicate the initial uplink BWP (initial UL BWP) configuration for a serving cell (e.g., a SpCell and Scell). The base station may transmit initialDownlinkBWP and/or initialUplinkBWP which may be included in SIB1, RRC parameter ServingCellConfigCommon, or RRC parameter ServingCellConfig to the UE.

SIB1, which is a cell-specific system information block (SystemInformationBlock, SIB), may contain information relevant when evaluating if a UE is allowed to access a cell and define the scheduling of other system information. SIB1 may also contain radio resource configuration information that is common for all UEs and barring information applied to the unified access control. The RRC parameter ServingCellConfigCommon is used to configure cell specific parameters of a UE's serving cell. The RRC parameter ServingCellConfig is used to configure (add or modify) the UE with a serving cell, which may be the SpCell or an SCell of an MCG or SCG. The RRC parameter ServingCellConfig herein are mostly UE specific but partly also cell specific.

The base station may configure the UE with a RRC parameter BWP-Downlink and a RRC parameter BWP-Uplink. The RRC parameter BWP-Downlink can be used to configure an additional DL BWP. The RRC parameter BWP-Uplink can be used to configure an additional UL BWP. The base station may transmit the BWP-Downlink and the BWP-Uplink which may be included in RRC parameter ServingCellConfig to the UE.

If a UE is not configured (provided) initialDownlinkBWP from a base station, an initial DL BWP is defined by a location and number of contiguous PRBs, starting from a PRB with the lowest index and ending at a PRB with the highest index among PRBs of a CORESET for Type0-PDCCH CSS set (i.e., CORESET 0), and a SCS and a cyclic prefix for PDCCH reception in the CORESET for Type0-PDCCH CSS set. If a UE is configured (provided) initialDownlinkBWP from a base station, the initial DL BWP is provided by initialDownlinkBWP. If a UE is configured (provided) initialUplinkBWP from a base station, the initial UL BWP is provided by initialUplinkBWP.

The UE may be configured by the based station, at least one initial BWP and up to 4 additional BWP(s). One of the initial BWP and the configured additional BWP(s) may be activated as an active BWP. The UE may monitor DCI format, and/or receive PDSCH in the active DL BWP. The UE may not monitor DCI format, and/or receive PDSCH in a DL BWP other than the active DL BWP. The UE may transmit PUSCH and/or PUCCH in the active UL BWP. The UE may not transmit PUSCH and/or PUCCH in a BWP other than the active UL BWP.

A base station may transmit a RRC message including one or more RRC parameters related to CORESET configuration. A base station may configure a UE one or more CORESETs for each DL BWP in a serving cell. For example, a RRC parameter ControlResourceSetZero is used to configure CORESET 0 of an initial DL BWP. The RRC parameter ControlResourceSetZero corresponds to 4 bits. The base station may transmit ControlResourceSetZero, which may be included in MIB or RRC parameter ServingCellConfigCommon, to the UE. MIB may include the system information transmitted on BCH(PBCH). A RRC parameter related to initial DL BWP configuration may also include the RRC parameter ControlResourceSetZero. A RRC parameter ControlResourceSet is used to configure a time and frequency CORESET other than CORESET 0. A RRC parameter ControlResourceSetId included in the ControlResourceSet is CORESET index, used to identify a CORESET within a serving cell.

A base station may transmit a RRC message including one or more RRC parameters related to search space configuration. A base station may determine one or more RRC parameter(s) related to search space configuration for a UE. A UE may receive, from a base station, a RRC message including one or more RRC parameters related to search space configuration. RRC parameter(s) related to search space configuration (e.g. SearchSpace, or SearchSpace-v16) defines how and where to search for PDCCH candidates. The RRC parameter(s) related to search space configuration (e.g. SearchSpace, SearchSpace-v16) may have different information element structures. 'search/monitor for PDCCH candidate for a DCI format' may also refer to 'monitor/search for a DCI format' for short.

FIG. 2 is a diagram illustrating a RRC parameter (RRC information) SearchSpace with an information element structure A 200.

A RRC parameter SearchSpace is related to search space configuration. The RRC parameters search space may include a plurality of RRC parameters as like, searchSpaceId, controlResourceSetId, monitoringSlotPeriodicityAndOffset, duration, monitoringSymbolsWithinSlot, nrofCandidates, searchSpaceType. Some of the above-mentioned RRC parameters may be present or absent in the RRC parameters SearchSpace. Namely, the RRC parameter SearchSpace may include all the above-mentioned RRC parameters. Namely, the RRC parameter SearchSpace may include one or more of the above-mentioned RRC parameters. If some of the parameters are absent in the RRC parameter SearchSpace, the UE 102 may apply a default value for each of those parameters.

Here, the RRC parameter searchSpaceId is an identity or an index of a search space. The RRC parameter searchSpaceId is used to identify a search space. Or rather, the RRC parameter serchSpaceId provide a search space set index s, 0<=s<40. Then a search space set s hereinafter may refer to a search space set identified by index s indicated by RRC parameter searchSpaceId. The RRC parameter controlResourceSetId concerns an identity of a CORESET, used to identify a CORESET. The RRC parameter controlResourceSetId indicates an association between the search space s and the CORESET identified by controlResourceSetId. The RRC parameter controlResourceSetId indicates a CORESET applicable for the search space. CORESET p hereinafter may refer to a CORESET identified by index p indicated by RRC parameter controlResourceSetId. Each search space set is associated with one CORESET. The RRC parameter monitoringSlotPeriodicityAndOffset is used to indicate slots for PDCCH monitoring configured as periodicity and offset. Specifically, the RRC parameter monitoringSlotPeriodicityAndOffset indicates a PDCCH monitoring periodicity of $k_s$ slots and a PDCCH monitoring offset of $o_s$ slots. A UE can determine which slot is configured for PDCCH monitoring according to the RRC parameter monitoringSlotPeriodicityAndOffset. The RRC parameter monitoringSymbolsWithinSlot is used to indicate a first symbol(s) for PDCCH monitoring in the slots configured for PDCCH monitoring. That is, the parameter monitoringSymbolsWithinSlot provides a PDCCH monitoring pattern within a slot, indicating first symbol(s) of the CORESET within a slot (configured slot) for PDCCH monitoring. The RRC parameter duration indicates a number of consecutive slots $T_s$ that the search space lasts (or exists) in every occasion (PDCCH occasion, PDCCH monitoring occasion).

The RRC parameter may include aggregationLevel1, aggregationLevel2, aggregationLevel4, aggregationLevel8, aggregationLevel16. The RRC parameter nrofCandidates may provide a number of PDCCH candidates per CCE aggregation level L by aggregationLevel1, aggregationLevel2, aggregationLevel4, aggregationLevel8, and aggregationLevel16, for CCE aggregation level 1, CCE aggregation level 2, CCE aggregation level 4, for CCE aggregation level 8, and CCE aggregation level 16, respectively. In other words, the value L can be set to either one in the set {1, 2, 4, 8, 16}. The number of PDCCH candidates per CCE aggregation level L can be configured as 0, 1, 2, 3, 4, 5, 6, or 8. For example, in a case the number of PDCCH candidates per CCE aggregation level L is configured as 0, the UE may not search for PDCCH candidates for CCE aggregation L. That is, in this case, the UE may not monitor PDCCH candidates for CCE aggregation L of a search space set s. For example, the number of PDCCH candidates per CCE aggregation level L is configured as 4, the UE may monitor 4 PDCCH candidates for CCE aggregation level L of a search space set s.

The RRC parameter searchSpaceType is used to indicate that the search space set s is either a CSS set or a USS set. The RRC parameter searchSpaceType may include either a common or a ue-Specific. The RRC parameter common configure the search space set s as a CSS set and DCI format to monitor. The RRC parameter ue-Specific configures the search space set s as a USS set. The RRC parameter ue-Specific may include dci-Formats. The RRC parameter dci-Formats indicates to monitor PDCCH candidates either for DCI format 0_0 and DCI format 1_0, or for DCI format 0_1 and DCI format 1_1 in search space set s. That is, the RRC parameter searchSpaceType indicates whether the search space set s is a CSS set or a USS set as well as DCI formats to monitor for.

A USS at CCE aggregation level L is defined by a set of PDCCH candidates for CCE aggregation L. A USS set may be constructed by a plurality of USS corresponding to respective CCE aggregation level L. A USS set may include one or more USS(s) corresponding to respective CCE aggregation level L. A CSS at CCE aggregation level L is defined by a set of PDCCH candidates for CCE aggregation L. A CSS set may be constructed by a plurality of USS corresponding to respective CCE aggregation level L. A CSS set may include one or more CSS(s) corresponding to respective CCE aggregation level L.

As above-mentioned, the RRC parameter SearchSpace with information element structure A is capable of indicating that the search space set s is a CSS (e.g. a CSS set) or a USS (e.g. a USS set). A base station may configure a UE to whether monitor PDCCH candidates for DCI format 0_0 and DCI format 1_0, or for DCI format 0_1 and DCI format 1_1 in a USS set via the RRC parameter SearchSpace with information element structure A. That is, the base station may not configure a UE to monitor PDCCH candidates for a different DCI format(s) other than the existing DCI format(s) {DCI format 0_0, DCI format 1_0, DCI format 0_1, DCI format 1_1} in the USS set via the RRC parameter SearchSpace with information element structure A. In other words, the UE may, based on the received RRC parameter SearchSpace from the base station, monitor PDCCH candidates either for DCI format 0_0 and DCI format 1_0, or for DCI format 0_1 and DCI format 1_1 in a USS. The UE may be not be configured to monitor PDCCH candidates for a different DCI format(s) other than the existing DCI format(s) {DCI format 0_0, DCI format 1_0, DCI format 0_1, DCI format 1_1} in the USS.

Communication with new service traffic type like (but not limited to) URLLC may require new DCI format(s) design other than the existing DCI formats. For example, some new fields may be introduced in a new DCI format to implement different communication features. For example, some fields included in the existing DCI formats may be not necessary any more to adapt different communication features. In order to implement communication feature with different service traffic types, different DCI formats may be generated according to different service traffic types. Introduction of new DCI format(s) other than the existing DCI formats would be beneficial and efficient for communication with a new service traffic type like URLLC between based station(s) and UE(s). Hence, the RRC parameter SearchSpace with current information element structure A may be problematic, which is incapable of indicating a new DCI format. It would be beneficial to introduce a RRC parameter related to search space configuration with a new information element structure so that the base station may indicate/configure a UE to monitor PDCCH candidates for new DCI format(s) other than the existing DCI formats in a USS.

FIG. 3 is a diagram illustrating a RRC parameter SearchSpace-v16 with an information element structure B 300.

The RRC parameter SearchSpace-v16 with an information element structure B is related to search space configuration. As one example 302, the RRC parameter SearchSpace-v16 with an information element structure B may include a plurality of RRC parameters as like, searchSpaceId, controlResourceSetId, monitoringSlotPeriodicityAndOffset, duration, monitoringSymbolsWithinSlot, nrofCandidates, searchSpaceType. Some of the above-mentioned RRC parameters may be present or absent in the RRC parameters SearchSpace-v16. The searchSpaceType-v16 included in RRC parameter SearchSpace-v16 with an information element structure B may be different from the searchSpaceType included in the RRC parameter SearchSpace with information element structure A. The searchSpaceType-v16 may only indicate that the search space set s is a USS set. The searchSpaceType-v16 may not be used to indicate that the search space set s is a CSS set. The RRC parameter searchSpaceType-v16 may include ue-Specific. The RRC parameter searchSpaceType-v16 may not include common. The RRC parameter searchSpaceType-v16 may also include dci-Format-v16. The dci-Format-v16 may be used to indicate whether the UE monitors PDCCH candidates in the USS for DCI formats 0_0 and 10, or for DCI formats 0_2 and 1_2. That is, the dci-Format-v16 may be used to indicate which for DCI formats 0_0 and 1_0, or for DCI formats 0_2 and 1_2, the UE monitors PDCCH candidates in the USS. Additionally or alternatively, the dci-Format-v16 may be used to indicate which for DCI formats 0_0 and 1_0, or for DCI formats 0_1 and 1_1, or for DCI formats 0_2 and 1_2, the UE monitors PDCCH candidates in the USS. Additionally or alternatively, the dci-Format-v16 may be used to indicate which for DCI formats 0_2, or for DCI format 1_2, the UE monitors PDCCH candidates in the USS. Additionally or alternatively, the RRC parameter searchSpaceType-v16 may not include a RRC parameter (e.g. dci-Format-v16). That is, if a USS is configured/provided by the RRC parameter SearchSpace-v16, the UE may implicitly determine to monitor PDCCH candidates in the USS for DCI formats 02 and/or 12.

As one example 304, the RRC parameter SearchSpace-v16 with an information element structure B may include a RRC parameter ue-Specific-v16. The ue-Specific-v16 is used to configure the search space as a USS set. The RRC parameter SearchSpace-v16 with an information element structure B may not include a RRC parameter common which is used to configure a search space set s as a CSS set. The RRC parameter ue-Specific-v16 may include a RRC parameter formats0-2-And-1-2. The RRC parameter formats0-2-And-1-2 may configure a UE to monitor PDCCH candidates in the USS set for DCI format 0_2 and DCI format 1_2. Additionally or alternatively, the RRC parameter formats0-2-And-1-2 may configure a UE to monitor PDCCH candidates in the USS set for DCI format 0_2 or for DCI format 12.

As described in both 302 and 304, the RRC parameter SearchSpace-v16 with an information element structure B is not capable of indicating that the search space set s is a CSS (e.g. a CSS set). The RRC parameter SearchSpace-v16 with an information element structure B is capable of indicating that the search space set s is a USS. As described in 202, the RRC parameter SearchSpace with an information element structure A is capable of indicating that the search space set s is a CSS (e.g. a CSS set) or a USS (e.g. a USS set).

FIG. 4 is a diagram illustrating a RRC parameter SearchSpace-v16 with an information element structure C 400.

The RRC parameter SearchSpace-v16 with an information element structure C is related to search space configuration. As depicted in 402, the RRC parameter SearchSpace-v16 with an information element structure C may include a RRC parameter searchSpaceType-v16. The RRC parameters common, ue-Specific, ue-Specific-v16 included in searchSpaceType-v16, may be used to indicate that the search space set s is a CSS set, a USS set A, or a USS set B, respectively. The USS set A (ue-Specific) may indicate whether a UE monitor for DCI formats 0_0 and 1_0 or for DCI formats 0_1 and 1_1 in the USS set A. A RRC parameter nrofCandidates-v16, which may be included in SearchSpace-v16 but may not be included in ue-Specific, may provide a number of PDCCH candidates per CCE aggregation level L for DCI formats 0_0 and 1_0 or for DCI formats 0_1 and 1_1. The USS set B (ue-Specific-v16) may indicate that a UE may monitor for DCI formats 0_2 and 1_2 in the USS set. Furthermore, the ue-Specific-v16 may further include a RRC parameter nrofCandidates-v16 which may provide a number of PDCCH candidates per CCE aggregation level L for DCI formats 0_2 and 1_2. Hence, The RRC parameter SearchSpace-v16 with an information element structure C is capable of indicating that a search space set is a CSS set, a first USS set (USS set A), or a second USS set (USS set B). The CSS set (common) may indicate that a UE may monitor for DCI formats 00 and 10 in the CSS set.

According to another example, a RRC parameter searchSpaceType-v16 in 402 may include either a common or a ue-Specific and but may not include ue-Specific-v16. In this case, the RRC parameter dci-Formats included in ue-Specific may indicate whether a UE may monitor PDCCH candidates for DCI format 0_0 and DCI format 1_0, or for DCI format 0_1 and DCI format 1_1, or for DCI format 0_2 and DCI format 12 in the USS set. Furthermore, in a case that dci-Formats indicates a UE to monitor PDCCH candidates for DCI format 0_2 and DCI format 1_2, the dci-Formats may further include a RRC parameter nrofCandidates-v16 which may provide a number of PDCCH candidates per CCE aggregation level L for the DCI format 0_2 and DCI format 12. Otherwise, the RRC parameter nrofCandidates-v16 may be absent in the dci-Formats.

The RRC parameters as like searchSpaceId, controlResourceSetId, monitoringSlotPeriodicityAndOffset, duration, monitoringSymbolsWithinSlot, nrofCandidates in 302, 304, and 402 may have same usage as those in 202. Some of the above-mentioned RRC parameters may be present or absent in the RRC parameters SearchSpace-v16.

A PDCCH may consist of one or more control channel elements (CCEs). A CCE may consist of 6 resource element groups (REGs). A REG may equal one resource block during one OFDM symbol. The PDCCH is used for transmitting Downlink Control Information (DCI) in a case of downlink radio communication (radio communication from the base station to the UE). Here, one or more DCIs (may be referred to as DCI formats) are defined for transmission of downlink control information. Information bits are mapped to one or more fields defined in a DCI format. A UE may monitor a set of PDCCH candidates in one or more control Resource set (CORESET) on an active DL BWP on an activated cell. Monitoring means decoding each PDCCH candidate according to the monitored DCI formats.

A set of PDCCH candidates for a UE to monitor is defined in terms of PDCCH search space sets. A PDCCH candidate for a search space sets may correspond to a set of CCEs in a CORESET associated with the search space set s. In the present disclosure, the term "PDCCH search space sets" may also refer to "PDCCH search space". In the present disclosure, the term "search space sets" may also refer to "search space". A UE monitors PDCCH candidates in one or more of search space sets. A search space sets can be a common search space (CSS) set or a UE-specific search space (USS) set. In some implementations, a CSS set may be shared/configured among multiple UEs. The multiple UEs may search PDCCH candidates in the CSS set. In some implementations, a USS set is configured for a specific UE. The UE may search one or more PDCCH candidates in the USS set. In some implementations, a USS set may be at least derived from a value of C-RNTI addressed to a UE. In other words, a UE can determine the CCE indexes for aggregation level L corresponding to PDCCH candidates of a USS for a USS set based on the value of C-RNTI addressed to the UE. The UE can determine the CCE indexes for aggregation level L corresponding to PDCCH candidates of a CSS for a CSS set without the value of C-RNTI addressed to the UE.

A UE may monitor a set of PDCCH candidates in one or more of the following search space sets a Type0-PDCCH CSS set configured by pdcch-ConfigSIB1 in MIB or by searchSpaceSIB1 in PDCCH-ConfigCommon or by searchSpaceZero in PDCCH-ConfigCommon for a DCI format with CRC scrambled by a SI-RNTI on the primary cell of the MCG a Type0A-PDCCH CSS set configured by searchSpaceOtherSystemInformation in PDCCH-ConfigCommon for a DCI format with CRC scrambled by a SI-RNTI on the primary cell of the MCG a Type1-PDCCH CSS set configured by ra-SearchSpace in PDCCH-ConfigCommon for a DCI format with CRC scrambled by a RA-RNTI or a TC-RNTI on the primary cell a Type2-PDCCH CSS set configured by paging-SearchSpace in PDCCH-ConfigCommon for a DCI format with CRC scrambled by a P-RNTI on the primary cell of the MCG a Type3-PDCCH CSS set configured by SearchSpace in PDCCH-Config with searchSpaceType=common for DCI formats with CRC scrambled by INT-RNTI, SFI-RNTI, TPC-PUSCH-RNTI, TPC-PUCCH-RNTI, or TPC-SRS-RNTI and, only for the primary cell, C-RNTI, MCS-C-RNTI, or CS-RNTI(s), and a USS set configured by SearchSpace in PDCCH-Config with searchSpaceType=ue-Specific for DCI formats with CRC scrambled by C-RNTI, MCS-C-RNTI, SP-CSI-RNTI, or CS-RNTI(s).

A UE may monitor a set of PDCCH candidates in the configured monitoring occasions in one or more configured control resource sets (CORESETs) according to the corresponding search space configurations.

DCI formats (or DCI) may be clarified as DCI format 0_0, DCI format 1_0, DCI format 1_1 (DCI format C), DCI format 0_1 (DCI format D), DCI format 1_2 (DCI format E), DCI format 0_2 (DCI format F), and so on.

DCI format 1_0 may be used for the scheduling of PDSCH in one cell. A UE may monitor the DCI format 1_0 with CRC scrambled by C-RNTI or CS-RNTI or MCS-C-RNTI or P-RNTI or SI-RNTI or RA-RNTI or TC-RNTI. The UE may monitor the DCI format 0_0 in a CSS (e.g. a CSS set) or a USS (e.g. a USS set). DCI format 0_0 may be used for the scheduling of PUSCH in one cell. A UE may monitor the DCI format 0_0 with CRC scrambled by C-RNTI or CS-RNTI or MCS-C-RNTI or TC-RNTI. The UE may monitor the DCI format 0_0 in a CSS (e.g. a CSS set) or a USS (e.g. a USS set).

Furthermore, the DCI format 1_0 monitored in a CSS may be used for the scheduling of broadcasting data. The DCI format 1_0 monitored in a CSS may be also used for the scheduling of UE-specific data. The DCI format 0_0 may be used for the scheduling of UE-specific data.

DCI format 0_0 may include predefined fields with fixed bits except for the 'Frequency domain resource assignment' field. The fields for DCI format 0_0 sequentially correspond to, 'Identifier for DCI formats' field with 1 bit, 'Frequency domain resource assignment' field, 'Time domain resource assignment' field with 4 bits, 'Frequency hopping flag' field with 1 bit, 'Modulation and coding scheme' field with 5 bits, 'New data indicator' field with 1 bit, 'Redundancy version' field with 2 bits, 'HARQ process number' field with 4 bits, 'TPC command for scheduled PUSCH' field with 2 bits, 'UL/SUL indicator' field with 1 bit. The size of the 'Frequency domain resource assignment' field for DCI format 0_0 may be determined based on a size of a UL bandwidth part. For example, the size of the 'Frequency domain resource assignment' field may be determined based on Formula (1) ceil($\log_2$ ($N_{RB}^{UL,BWP}$ ($N_{RB}^{UL,BWP}$+1)/2)) wherein the $N_{RB}^{UL,BWP}$ is a size of UL bandwidth part. The function ceil(x) means the function that takes as input a real number x and gives as output the least integer greater than or equal to x.

DCI format 1_0 may include predefined fields with fixed bits except for the 'Frequency domain resource assignment' field. The fields for DCI format 1_0 sequentially correspond to, 'Identifier for DCI formats' field with 1 bit, 'Frequency domain resource assignment' field, 'Time domain resource assignment' field with 4 bits, 'VRB-to-PRB mapping' field with 1 bit, 'Modulation and coding scheme' field with 5 bits, 'New data indicator' field with 1 bit, 'Redundancy version' field with 2 bits, 'HARQ process number' field with 4 bits, 'Downlink assignment index' field with 2 bits, 'TPC command for scheduled PUCCH' field with 2 bits, 'PUCCH resource indicator' field with 3 bits, 'PDSCH-to-HARQ_feedback timing indicator' field with 3 bits. The size of the 'Frequency domain resource assignment' field for DCI format 1_0 may be determined based on a size of a DL bandwidth part, and/or a size of CORESET 0. For example, the size of the 'Frequency domain resource assignment' field may be determined based on Formula (2) $\mathrm{ceil}(\log_2 (N_{RB}^{DL,BWP} (N_{RB}^{DL,BWP}+1)/2))$ wherein the $N_{RB}^{DL,BWP}$ is a size of UL bandwidth part or a size of CORESET 0.

DCI format 0_0 and DCI format 1_0 can be configured to be monitored in a CSS (e.g. a CSS set) or a USS (e.g. a USS set). The DCI format 0_0 and DCI format 1_0 being monitored in a CSS may be also called as default DCI formats. In other words, the DCI format 0_0 and DCI format 1_0 being monitored in a USS may not be called as default DCI formats.

DCI format C may refer to DCI format (e.g. DCI format 1_1) monitored in a USS. DCI format C (DCI format 1_1) may be used for the scheduling of PDSCH in one cell. DCI format 1_1 may schedule up to two transport blocks for one PDSCH. A UE may monitor the DCI format 1_1 with CRC scrambled by C-RNTI or CS-RNTI or MCS-C-RNTI. The UE may monitor the DCI format 1_1 in a USS The UE may not monitor the DCI format 1_1 in a CSS. DCI format 1_1 may be used for the scheduling of UE-specific data. DCI format 1_1 may include a plurality of fields with fixed bits and a plurality of fields with variable bits. The size of fields with variable bits are determined based on corresponding RRC configuration.

DCI format D may refer to DCI format (e.g. DCI format 0_1) monitored in a USS. DCI format 0_1 may be used for the scheduling of PUSCH in one cell. DCI format 0_1 may schedule up to two transport blocks for one PUSCH. A UE may monitor the DCI format 0_1 with CRC scrambled by C-RNTI or CS-RNTI or SP-CSI-RNTI or MCS-C-RNTI. The UE may monitor the DCI format 0_1 in a USS. The UE may not monitor the DCI format 0_1 in a CSS. DCI format 0_1 may be used for the scheduling of UE-specific data. DCI format 0_1 may include a plurality of fields with fixed bits and a plurality of fields with variable bits. The size of fields with variable bits are determined based on corresponding RRC configuration.

DCI format E may refer to DCI format (e.g. DCI format 1_2) monitored in a USS. DCI format 1_2 may be used for the scheduling of PDSCH in one cell. DCI format 1_2 may schedule one transport block for one PDSCH. A UE may monitor the DCI format 1_2 in a USS. The UE may not monitor the DCI format 1_2 in a CSS. DCI format 1_2 may be used for the scheduling of UE-specific data. DCI format 1_2 may include a plurality of fields with fixed bits and a plurality of fields with variable bits. The size of fields with variable bits are determined based on corresponding RRC configuration. DCI format 1_2 may not consist of some fields (e.g. 'CBG transmission information' field), which may be present in DCI format 1_1.

DCI format F may refer to DCI format (e.g. DCI format 0_2) monitored in a USS. DCI format 0_2 may be used for the scheduling of PUSCH in one cell. DCI format 0_2 may schedule one transport block for one PUSCH. Additionally, UE may monitor the DCI format F with CRC scrambled by C-RNTI or CS-RNTI or SP-CSI-RNTI or MCS-C-RNTI. The UE may monitor the DCI format 0_2 in a USS. The UE may not monitor the DCI format 0_2 in a CSS. DCI format 0_2 may be used for the scheduling of UE-specific data. DCI format 0_2 may include a plurality of fields with fixed bits and a plurality of fields with variable bits. The size of fields with variable bits are determined based on corresponding RRC configuration. DCI format 0_2 may not consist of some fields (e.g. 'CBG transmission information' field), which may be present in DCI format 0_1.

DCI formats C and D may be used to schedule traffic service data (e.g. eMBB). For example, DCI format C may be used to schedule a first PDSCH transmitting eMBB data. DCI format D may be used to schedule a first PUSCH transmitting eMBB data.

DCI formats E and F may be used to schedule traffic service data (e.g. URLLC). For example, DCI format E may be used to schedule a second PDSCH transmitting URLLC data. DCI format F may be used to schedule a second PUSCH transmitting URLLC data. Additionally or alternatively, DCI formats E and F may be DCI formats with CRC scrambled by a second RNTI which is different from a first RNTI(s) for DCI formats C and D. That is, DCI format E may be a DCI format 1_1 with CRC scrambled by a second RNTI. DCI format C may be a DCI format 1_1 with CRC scrambled by a first RNTI (e.g. C-RNTI). DCI format F may be a DCI format 0_1 with CRC scrambled by a second RNTI. DCI format D may be a DCI format 0_1 with CRC scrambled by a first RNTI (e.g. C-RNTI).

Additionally or alternatively, DCI formats C and D may be transmitted in a first CORESET, while DCI formats E and F may be transmitted in a second CORESET which is different from the first CORESET. A RRC parameter, which is used to identity the DCI formats configured by dci-Formats are DCI formats C and D or DCI formats E and F, may be present (or set to 'enable') in a CORESET configuration for the second CORESET. The RRC parameter may be absent (or set to 'disable') in a CORESET configuration for the first CORESET. As mentioned above, a CORESET is associated with a search space set s, in which DCI formats are configured to monitor. For example, dci-Formats may indicate to monitor PDCCH candidates for DCI format 0_1 and DCI format 1_1 in search space set s. If the RRC parameter is absent in the CORESET configuration for the associated CORESET, the DCI format 0_1 and DCI format 1_1 monitored in the CORESET may refer to DCI format C and D. If the RRC parameter is present in the CORESET configuration for the associated CORESET, the DCI format 0_1 and DCI format 1_1 monitored in the CORESET may refer to DCI format E and F. That is, the DCI format C and D may be the DCI format 0_1 and DCI format 1_1 monitored in the first CORESET. The DCI format C and D may be the DCI format 0_1 and DCI format 1_1 monitored in the second CORESET.

Additionally or alternatively, DCI formats C and D may be transmitted in a first search space set s, while DCI formats E and F may be transmitted in a second search space set s which is different from the first search space set s. A RRC parameter, which is used to identity the DCI formats configured by dci-Formats are DCI formats C and D or DCI formats E and F, may be present (or set to 'enable') in ue-Specific (SearchSpace, or SearchSpace-v16) for the second search space set s. The RRC parameter may be absent (or set to 'disable') in ue-Specific (SearchSpace, or SearchSpace-v16) for the first search space set s. For example, dci-Formats may indicate to monitor PDCCH candidates for DCI format 01 and DCI format 1_1 in search space set s. If the RRC parameter is absent in ue-Specific for the search space set s, the DCI format 0_1 and DCI format 1_1 monitored in the search space set s may refer to DCI format C and D. If the RRC parameter is present in ue-Specific for the search space set s, the DCI format 0_1 and DCI format 1_1 monitored in the search space set s may refer to DCI format E and F. That is, the DCI format C and D may be the DCI format 0_1 and DCI format 1_1 configured in the first search space set s. The DCI format E and F may be the DCI format 0_1 and DCI format 1_1 configured in the second search space set s.

DCI (format) used for the downlink scheduling is also referred to as downlink grant or downlink assignment. DCI (format) used for the uplink scheduling is also referred to as uplink grant or uplink assignment.

Different DCI formats (DCI) may consist of different fields. The fields defined in the DCI formats maybe mapped to a number of information bits. Each field may be mapped to 0, 1, or more bits of the information bits. That is, a field may include 0, 1, or more bits of the information bits. In a case that a field is mapped to 0 bit, the UE may determine the field is absent in the DCI format. In other words, if a field is mapped to 1, or more bits, the UE may determine the field is present in the DCI format. Furthermore, a field may also include 0, 1, or more zero-padding bit(s). If the number of the information bits in DCI format is less than 12 bits, zero may be appended to the DCI format until the payload size equals 12. A DCI format may include a plurality of fields and 0, 1, or more zero-padding bit(s). The payload size of a DCI format may be equal to a quantity of the information bits and zero-padding bits(s). The number of the zero-padding bits may be 0, 1, or more bits for a DCI format. Herein, the size of a DCI format (DCI format size, DCI size) may refer to the payload size of the DCI format. Alternatively, or additionally, the size of a DCI format may also refer to the size of the information bits of the DCI format.

A base station may transmit, to a UE, a PDCCH with a DCI (a scheduling DCI, a DCI format). The scheduling DCI may be used to schedule a PDSCH with a transport block. In other words, the base station may further transmit, to the UE, a transport block in a PDSCH scheduled by a DCI transported in a PDCCH. A UE may receive, from a base station, a DCI (a scheduling DCI) in the PDCCH and may further receive a transport block in a PDSCH scheduled by the DCI transported in the PDCCH.

A base station may transmit, to a UE, a PDCCH with a DCI (a scheduling DCI, a DCI format). The scheduling DCI may be used to schedule a PUSCH with a transport block. A UE may receive, from a base station, a DCI (a scheduling DCI) in the PDCCH and may further transmit, to a base station, a transport block in a PUSCH scheduled by the DCI transported in the PDCCH. The base station may receive, from the UE, a transport block in a PUSCH scheduled by the DCI transported in the PDCCH.

FIG. 5 is a diagram illustrating one example of MCS index table 500.

FIG. 5 is one example of a predefined MCS index table 500 which includes 32 entries (elements, rows) of MCS configuration. The predefined MCS index table 500 may be provided in specifications and can be used for PDSCH and/or PUSCH. Each entry of MCS configuration corresponds to an MCS index identified by $I_{MCS}$. The value of $I_{MCS}$ is in a range of $\{0, \ldots, 31\}$. Each entry in the table may contain an MCS index $I_{MCS}$, a modulation order $Q_m$, a target code rate R, and a value for spectral efficiency. A UE may be provided with more than one predefined MCS index tables in the specifications. That is, specifications may predefine more than one MCS index tables. The predefined MCS index tables may be used for PDSCH and PUSCH. These predefined MCS index tables are known to the UEs and the base stations. A base station may instruct a UE to use which MCS index table from the more than one MCS index tables. In other words, the base station may transmit, to the UE, a RRC parameter included in a RRC message to indicate which MCS index table the UE use for PDSCH. The UE may determine to use which MCS index table for PDSCH based on the received RRC parameter from the base station. Furthermore, the base station may transmit, to the UE, another RRC parameter included in the same RRC message to indicate which MCS index table the UE use for PUSCH. The UE may determine to use which MCS index table for PUSCH based on the received another RRC parameter. The MCS index table used for PDSCH may be same with the MCS index table used for PUSCH. The MCS index table used for PDSCH may be different from the MCS index table used for PUSCH. A predefined MCS index table hereinafter may refer to a MCS index table which is indicated by the RRC parameter.

When a base station plans to indicate a UE to receive a transport block in a PDSCH or to transmit a transport block in a PUSCH, the base station may determine a modulation order $Q_m$, target code rate R, spectral efficiency for the PDSCH or the PUSCH at least based on the channel state information reported by the UE and the available time and frequency resource. In other words, the base station may determine a modulation order $Q_m$, target code rate R, spectral efficiency from a determined MCS index table and then may generate a 'Modulation and coding scheme' field. Then the base station may transmit, to the UE, a DCI format including the generated 'Modulation and coding scheme' field in a PDCCH. The UE may upon detection of a PDCCH with the DCI format, may read the 'Modulation and coding scheme' field in the scheduling DCI format.

For a PDSCH (or a PUSCH) scheduled by a DCI format, a UE may read the 'Modulation and coding scheme' field in the scheduling DCI format to determine a modulation order $Q_m$, target code rate R for the PDSCH (or the PUSCH) based on the determined MCS index table. For example, for a UE, the MCS index table may be determined as MCS index table 500. If 'Modulation and coding scheme' field in the scheduling DCI indicates value 0, the UE may use an entry with $I_{MCS}=0$ in the MCS index table 500 to determine the modulation $Q_m$ and target code rate R for the PDSCH (or the PUSCH) scheduled by the scheduling DCI. If 'Modulation and coding scheme' field in the scheduling DCI indicates value 10, the UE may use an entry with $I_{MCS}=10$ in the MCS index table 500 to determine the modulation $Q_m$ and target code rate R for the PDSCH (or the PUSCH) scheduled by the scheduling DCI. For a PDSCH (or the PUSCH) scheduled by a DCI format, which $I_{MCS}$ is used is according to the value of the 'Modulation and coding scheme' field.

After determining the $Q_m$ and R, the UE (or the base station) may at least use the determined $Q_m$ and R with other information to further determine the transport block size (TBS) for the transport block in the PDSCH or the PUSCH. The other information may be provided by the scheduling DCI and the RRC parameters. For example, the other information may include the information as like the number of layers (u), the total number of allocated resource blocks of the PDSCH (or the PUSCH), the total number of allocated symbols of the PDSCH (or the PUSCH), which are provided by respective DCI field in the scheduling DCI. The other information may include the information as like the DMRS configuration, overhead from CSI-RS, CORESET, which are provided by RRC parameters.

As above-mentioned, the base station and/or the UE may determine the TBS for a transport block in the PDSCH or the PUSCH at least based on the received $I_{MCS}$ in the scheduling DCI. For example, as depicted in FIG. 5, for $0 \leq I_{MCS} \leq 28$, each index (entry) $I_{MCS}$ may provide a modulation order $Q_m$, target code rate R, and a value for spectral efficiency. For $29 \leq I_{MCS} \leq 31$, each index (entry) $I_{MCS}$ may provide a modulation order $Q_m$, and may not provide a target code rate R and a value for spectral efficiency. In other others, the target code rate R and the value for spectral efficiency are reserved for $I_{MCS}$ in $28 \leq I_{MCS} \leq 31$. Hereinafter, those $I_{MCS}$ where the target code rate R and the value for spectral efficiency are reserved (or are not provided) may be termed as reserved $I_{MCS}$. Those $I_{MCS}$ where the target code rate R and the value for spectral efficiency are provided may be termed as non-reserved MCS index (entry) $I_{MCS}$. In the MCS index table 500, the reserved $I_{MCS}$ are those $I_{MCS}$ corresponding to $29 \leq I_{MCS} \leq 31$. In the MCS index table 500, the non-reserved MCS index $I_{MCS}$ are those $I_{MCS}$ corresponding to $0 \leq I_{MCS} \leq 28$. Therefore, the MCS index table may have 29 non-reserved MCS index $I_{MCS}$, each of which explicitly provides $Q_m$ and R, and may have 3 reserved MCS index $I_{MCS}$, each of which explicitly provides $Q_m$ but does not provide R.

For different predefined MCS index tables, the reserved MCS $I_{MCS}$ may be different. For example, for a predefined MCS index table which is different from the MCS index table 500, MCS index $I_{MCS}$ corresponding to $I_{MCS}=28$, $I_{MCS}=29$, $I_{MCS}=30$, $I_{MCS}=31$, may provide $Q_m=2$, $Q_m=4$, $Q_m=6$, $Q_m=8$, respectively, and may not provide the target code rate R and the value for spectral efficiency. These MCS index $I_{MCS}$ corresponding to $I_{MCS}=28$, $I_{MCS}=29$, $I_{MCS}=30$, $I_{MCS}=31$, may be termed as reserved $I_{MCS}$.

Given each reserved MCS index $I_{MCS}$ does not provide the target code rate R, the reserved MCS index $I_{MCS}$ may not be used to redetermine (recalculate) a TBS for a transport block. Therefore, the reserved $I_{MCS}$ may be at least used for a retransmission of a same transport block. An advantage of using the reserved $I_{MCS}$ is that the UE and the base station may not redetermine a TBS for a same transport block so that a transport block in an initial transmission has same TBS with the same transport block in the retransmission. By keeping the same TBS, the UE and/or the base station may combine the current received retransmission data with the previous data (e.g. initial transmission data) and may attempt to decode the combined data for the same transport block.

For a PDSCH (or a PUSCH) scheduled by a DCI format, the UE and the base station may determine the TBS for the transport block ate least based on the 'Modulation and coding scheme' field in the scheduling DCI. If the scheduling DCI indicates the $I_{MCS}$ in $0 \leq I_{MCS} \leq 28$ (as a non-reserved MCS index $I_{MCS}$), the UE and the base station may determine TBS for the transport block. If the scheduling DCI indicates the $I_{MCS}$ in $29 \leq I_{MCS} \leq 31$ (as a reserved MCS index $I_{MCS}$), the UE and the base station may assume that the TBS for the transport block is determined from the DCI transported in the latest PDCCH for the same transport block using $0 \leq I_{MCS} \leq 28$. That is, if the scheduling DCI indicates the $I_{MCS}$ in $29 \leq I_{MCS} \leq 31$, the UE and the base station may not redetermine the TBS for the transport block and reuse the determined TBS, which has already been determined from the DCI transported in the latest PDCCH for the same transport block using $0 \leq I_{MCS} \leq 28$. If the scheduling DCI indicates the $I_{MCS}$ in $0 \leq I_{MCS} \leq 28$, the UE and the base station may determine or redetermine the TBS for the transport block. Therefore, the non-reserved MCS index may be explicitly used to determine a TBS for a transport block, while the reserved MCS index may be implicitly used to determine a TBS for a transport block. For a transport block scheduled by a DCI format indicating the $I_{MCS}$ in $0 \leq I_{MCS} \leq 28$, a UE may determine the TBS for the transport block at least based on the $Q_m$ and R. The transmission of the transport block may be an initial transmission or a retransmission. For a transport block scheduled by a DCI format indicating the $I_{MCS}$ in $29 \leq I_{MCS} \leq 31$, a UE may assume that the TBS for the transport block is determined from a DCI format transported in the latest PDCCH for the same transport block using $0 \leq I_{MCS} \leq 28$. The transmission of the transport block may be a retransmission.

The 'Modulation and coding scheme' field may be set to 5 bits for DCI formats used to schedule eMBB traffic data. In other words, the DCI formats as like DCI format 1_0, DCI format 0_0, DCI format C and DCI format D may have a 'Modulation and coding scheme' with 5 bits so that 'Modulation and coding scheme' field can indicate every MCS index $I_{MCS}$ in a predefined MCS index table. However, for some DCI formats used to schedule URLLC traffic data, the 'Modulation and coding scheme' field may be no need to set to fixed 5 bits and may be have variable bits (bit width, size). The number of the various bits may be determined based on the corresponding RRC configuration. Comparing with the DCI formats used for scheduling eMBB traffic data, DCI formats used for scheduling URLLC traffic data may require a much higher reliability. It would be beneficial to reduce the bit width of same fields so that the reliability can be achieved. For example, the bit width of the 'Modulation and coding scheme' can be reduced for the DCI format E and DCI format F. By reducing the bit width of DCI fields in the DCI formats, the transmission reliability of the DCI formats may be improved.

In the present disclosure, DCI format 0_0, DCI format 1_0, DCI format C and DCI format D, may have the 'Modulation and coding scheme' field with 5 bits. The DCI format E and F may have a 'Modulation and coding scheme' field with variable bits. The number of the variable bits can be configurable and based on the corresponding RRC parameters.

Figure 6:
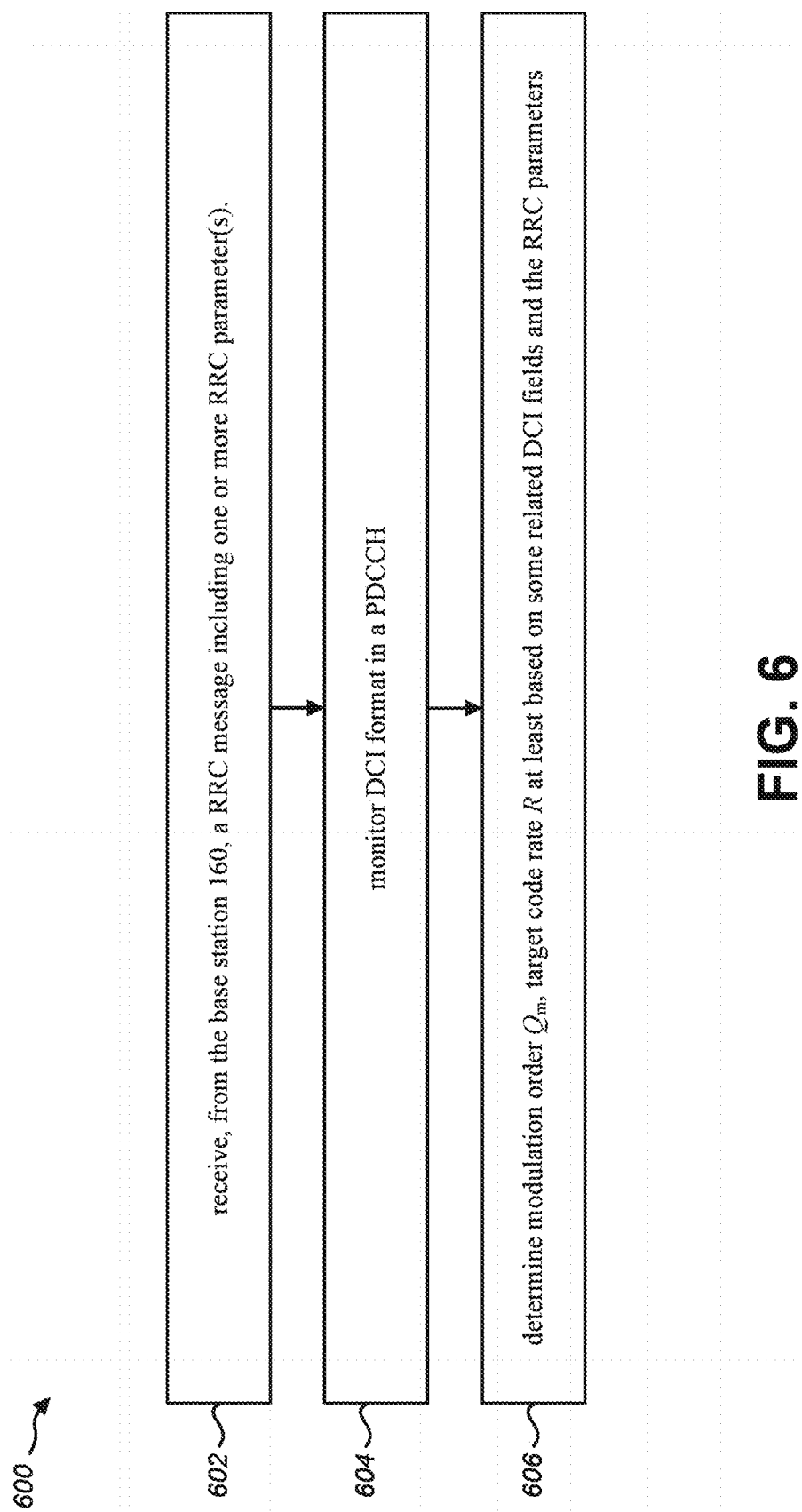
FIG. 6 is a flow diagram illustrating one implementation of a method 600 for determining $Q_m$, R, and TBS by a UE 102.

FIG. 6 is a flow diagram illustrating one implementation of a method 600 for determining $Q_m$, R, and TBS by a UE 102.

The UE 102 may receive 602, from the base station 160, a RRC message including one or more RRC parameter(s). At 602, the UE 102 may receive, from the base station 160, a RRC message including a RRC parameter (for example RRC parameter A) relating to MCS configuration. The RRC parameter A may contain one or more entries (rows, elements, index) of MCS configuration. That is, the RRC parameter A may be a list of configured MCS entries. Each entry of MCS may indicate a modulation order $Q_m$, a target code rate R, and a value for spectral efficiency. In other words, the RRC parameter A may not indicate some MCS entries, which provide modulation order $Q_m$ but not provide target code rate R. Hereinafter, the RRC parameter A containing one or more entries (rows, elements) of MCS configuration may refer to RRC configured MCS index table.

The entries of MCS configuration configured by RRC parameter (for example, RRC parameter A) may be applied to a first DCI format group (for example, the DCI format E and F). The entries of MCS configuration configured by RRC parameter may not be applied to a second DCI format group (for example, the DCI format 0_0, DCI format 1_0, DCI format C and F). In other words, the RRC configured MCS index table may be applied to the first DCI format group. The RRC configured MCS index table may not be applied to the second DCI format group. The above-mentioned determined predefined MCS index table may be applied to the second DCI format group. The above-mentioned determined predefined MCS index table may not be applied to the second DCI format group. However, in a case that the RRC parameter A (the RRC configured MCS index table) is not provided (transmitted), the UE 102 and the base station 160 may determine that the predefined MCS index table is applied to the first DCI format group.

FIG. 7 is a diagram illustrating one example of configured MCS index table by RRC parameter 700. For example, as depicted in FIG. 7, the RRC parameter A 702, received from base station, may contain 8 entries of MCS configuration. Each entry of MCS configuration in 702 may provide a modulation order $Q_m$, a target code rate R, and a value for spectral efficiency. The UE 102 may determine the bit width of the 'Modulation and coding scheme' field for DCI formats in the first DCI format group based on the number of entries in the RRC parameter A. For example, the UE may determine the bit width of the 'Modulation and coding scheme' field for DCI formats in the first DCI format group as Formula (3) ceil($\log_2$ (I)) wherein the I is the number of entries in the RRC parameter A. The function ceil(x) means the function that takes as input a real number x and gives as output the least integer greater than or equal to x. The value k (k>=0) indicated by the 'Modulation and coding scheme' field corresponds to the configured (k+1)-th entry of MCS configuration. In other words, value 0 indicated by the 'Modulation and coding scheme' field refers to the first entry (element) in this list of the first RRC parameter, value 1 indicated by the 'Modulation and coding scheme' field refers to the second element in this list, and so on. Here, the number of entries I in the RRC parameter A is 8. Therefore, the UE 102 may determine the bit width of the 'Modulation and coding scheme' field of the DCI formats in the first DCI format group as 3 bits. The UE 102 may determine the bit width of the 'Modulation and coding scheme' of the DCI formats in the second DCI format group as 5 bits.

Additionally or alternatively, at 602, the UE 102 may receive, from the base station 160, a RRC message including a RRC parameter (for example RRC parameter B) relating to MCS configuration. The RRC parameter B may indicate a starting MCS index S and MCS index length L. The starting MCS index S is used to indicate the UE 102 where the available MCS index starts in the predefined MCS index table. The MCS index length L is used to indicate the number of available MCS index counting from the starting MCS index S in the predefined MCS index table. In other words, the RRC parameter B may include L MCS entries. The UE may determine the bit width of the 'Modulation and coding scheme' field for DCI formats in the first DCI format group as Formula (4) ceil($\log_2$ (L)) wherein the L is the MCS index length indicated by the RRC parameter B. The value k (k>=0) indicated by the 'Modulation and coding scheme' field corresponds to the (k+S)-th index $I_{MCS}$ in the predefined MCS index table. In other words, value 0 indicated by the 'Modulation and coding scheme' field refers to the S-th index $I_{MCS}$ in the predefined MCS index table, value 1 indicated by the 'Modulation and coding scheme' field refers to the (S+1)-th index $I_{MCS}$ in the predefined MCS index table and so on.

At 604, the UE 102 may monitor PDCCH candidates for a DCI format. At 604, the UE 102 may monitor a PDCCH with a DCI format and may further receive a transport block in a PDSCH scheduled by the PDCCH with the DCI format. As above-mentioned, the UE 102 may determine the bit width of the 'Modulation and coding scheme' field for the received DCI formats. For those DCI formats in the second DCI format group, the UE 102 and the base station 160 may determine the 'Modulation and coding scheme' field as 5 bits. For those DCI formats in the first DCI format group, the UE 102 and the base station 160 may determine the 'Modulation and coding scheme' field based on the RRC parameter (e.g. RRC parameter A or RRC parameter B). However, in a case that the RRC parameter (e.g. RRC parameter A or RRC parameter B) is not provided, the UE 102 and the base station 160 may determine the 'Modulation and coding scheme' field as 5 bits for those DCI formats in the first DCI format group.

At 606, the UE 102 may read the 'Modulation and coding scheme' field in the scheduling DCI format (the received DCI format) to determine a modulation order $Q_m$, a target code rate R used for the transport block in the PDSCH (or the PUSCH). For a PDSCH (or a PUSCH) with a transport block scheduled by those DCI formats in the second DCI format group, the UE 102 may read the 'Modulation and coding scheme' field to derive the $I_{MCS}$ and determine the modulation order $Q_m$, the target code rate R based on the predefined MCS index table.

Hereinafter, an implementation of determining a modulation order and/or target code rate for a PDSCH (or a PUSCH) with a transport block scheduled by those DCI formats (those scheduling DCI formats) in the first DCI format group is described. At 606, for a transport block in a PDSCH (or a PUSCH) scheduled by those DCI formats in the first DCI format group, the UE 102 may determine a modulation order $Q_m$, a target code rate R, and/or a TBS, which are used for the transport block in the PDSCH (or the PUSCH), at least based on (i) a 'Modulation code scheme' field and one, a part, or all of a plurality of specified DCI fields other than the 'Modulation code scheme' field. The plurality of specified DCI fields may include one, a part, or all of (ii) a 'HARQ process number' field, (iii) a 'New data indicator' field, (iv) a 'time domain resource assignment' field, and (v) a 'frequency domain resource assignment' field.

Here, a first RRC parameter may be an above-mentioned RRC parameter A. A first RRC parameter may be an above-mentioned RRC parameter B.

Regarding (i), the 'Modulation code scheme' field may indicate a value X of MCS index $I_{MCS}$. In other words, the 'Modulation code scheme' field may indicate that $I_{MCS}=X$.

Regarding the factor (ii), the 'HARQ process number' field is used to indicate a HARQ process ID. The HARQ entity of the UE 102 may maintain a number of parallel HARQ processes. Each HARQ process is associated with a HARQ process ID. The MAC entity of the UE 102 may allocate a transport block scheduled by a DCI format to a HARQ process ID indicated by the same DCI format.

Regarding the factor (iii), the 'New data indicator' field with 1 bit is used to indicate a value of the NDI (new data indicator) as 0 or 1. For a HARQ process ID, the UE 102 may, if NDI has been toggled compared to the value of the previous received transmission, consider this transmission of the transport block to be a new transmission. If the transmission of the transport block is the very first received transmission, the UE 102 may consider this transmission of the transport block to be a new transmission. In other words, the NDI field may indicate a PDSCH (or a PUSCH) as an initial transmission of a transport block or a retransmission of a transport block. A PDSCH (or a PUSCH) transmission may be indicated as an initial transmission of a transport block or a retransmission of a transport block based on the NDI field. The base station may indicate, to a UE, that a PDSCH (or a PUSCH) is an initial transmission of a transport block or a retransmission of a transport block via the NDI field of a DCI format scheduling the transport.

Regarding the factor (v), some other specified DCI fields of the scheduling DCI may be one, a part, or all of a 'time domain resource assignment' field, and a 'frequency domain resource assignment' field. A 'time domain resource assignment' field may indicate a number of allocated symbols L. A 'frequency domain resource assignment' field may indicate a number of allocated resource blocks $n_{PRB}$.

In a first case that a PDSCH (or a PUSCH) is determined as an initial transmission of a transport block based on the NDI field of the first DCI format (the scheduling DCI format), the UE 102 may determine the modulation order and the target code rate as X-th entry in the first RRC parameter. That is, the MCS Index X-th entry in the first RRC parameter may provide the modulation order and the target code rate used for the transport block in the PDSCH (or the PUSCH). For example, the UE may select an MCS index $I_{MCS}=X$ from the first RRC parameter (e.g. 702). The determined target code rate may be used to determine a transport block size for the transport block in the PDSCH (or the PUSCH).

In a second case that a PDSCH (or a PUSCH) is determined as a retransmission of a transport block based on the NDI field of the first DCI format (the scheduling DCI format), the UE 102 may determine the modulation order as X-th entry in the first RRC parameter. That is, the X-th MCS (Index) entry in the first RRC parameter may provide the modulation order used for the transport block in the PDSCH (or the PUSCH). That is, the X-th MCS Index entry in the first RRC parameter may not provide the target code rate used for the transport block in the PDSCH (or the PUSCH). In other words, the target code rate provided in the X-th MCS Index entry in the first RRC parameter is not used for the transport block in the PDSCH (or the PUSCH). The UE 102 may discard the target code rate in the X-th MCS entry for the transport block in the PDSCH (or the PUSCH).

In the second case, the target code rate provided in the X-th MCS entry in the first RRC parameter may not be used to determine (or calculate) the TBS for the transport block size in the PDSCH (or the PUSCH). The UE 102 and the base station 160 may not redetermine (or recalculate) a TBS for the transport block. The UE 102 and the base station 160 may reuse a TBS, which is determined from a second DCI format transported in the latest PDCCH for initial transmission of the transport block. In other words, a target code rate which is used to determine the TBS for the transport block is determined based on the second DCI format scheduling an initial transmission of the transport block. Therefore, the UE 102 and the base station 160 may determine to whether use the target code rate R in the X-th MCS entry in the first RRC parameter based on whether the transmission of the transport block is an initial transmission or a retransmission.

Additionally or alternatively, in a third case that a PDSCH (or a PUSCH) is determined as an initial transmission of a transport block based on the NDI field of the first DCI format (the scheduling DCI format), the UE 102 may determine the modulation order and the target code rate as X-th entry in the first RRC parameter. That is, the UE may select an MCS index $I_{MCS}=X$ from the first RRC parameter (e.g. 702). The MCS index $I_{MCS}=X$ may provide the modulation order and the target code rate used for the transport block in the PDSCH (or the PUSCH).

In a fourth case that a PDSCH (or a PUSCH) is determined as a retransmission of a transport block based on the NDI field of the first DCI format (the scheduling DCI format), the UE 102 may consider (assume) that a first number of MCS entries in the first RRC parameter is replaced (interpreted) by a same number of reserved MCS index(entry). The first number can be determined based on a number of reserved MCS index $I_{MCS}$ in a predefined MCS index table. For example, in the predefined MCS index table 500, the number of reserved MCS index with $29 \leq I_{MCS} \leq 31$ is 3. That is, the UE 102 may consider that 3 MCS entries in the first RRC parameter is replaced by 3 reserved MCS index of the predefined MCS index table 500. These 3 reserved MCS indexes may provide modulation order $Q_m$ as 2, 4, 6 respectively. These 3 reserved MCS indexes may not provide target code rate R. These 3 reserved MCS indexes may be in the first three entries in the first RRC parameter as illustrated in 704 of FIG. 7. That is, the first 3 MCS entries may be replaced by the reserved MCS indexes. These 3 reserved MCS indexes in the first RRC parameter may be in the last three entries in the first RRC parameter as illustrated in 706 of FIG. 7. That is, the last 3 MCS entries in the first RRC parameter may be replaced by the reserved MCS indexes. The location of these 3 reserved MCS indexes in the first RRC parameter is determined based on the $I_{MCS}$ (the value X) indicated by a DCI format transported in the latest PDCCH for the same transport block using $0 \leq I_{MCS} \leq 28$. For example, if the $I_{MCS}$ indicated by the DCI format is in the first half entries of the first RRC parameter, the UE may consider that the last three MCS entries in the first RRC parameter are replaced by these 3 reserved MCS indexes. For example, if the $I_{MCS}$ indicated by the DCI format is in the latter half entries of the first RRC parameter, the UE may consider that the first three MCS entries in the first RRC parameter are replaced by these 3 reserved MCS indexes. Next, the UE 102 may select an MCS index $I_{MCS}=X$ from the first RRC parameter 704 or 706. The MCS index $I_{MCS}=X$ may provide the modulation order and the target code rate used for the transport block in the PDSCH (or the PUSCH).

Additionally or alternatively, even for a retransmission of the transport block indicated by the NDI field, the UE 102 may determine whether to replace some MCS entries in the first RRC parameter by the reserved MCS indexes further based on factor (v) some other specified DCI fields. For example, the UE 102 may determine whether to replace some MCS entries in the first RRC parameter further based on the 'time domain resource assignment' field. In a case that the number of allocated symbols L is same with that indicated by a 'time domain resource assignment' field of a DCI format transported in the latest PDCCH for the same transport block using $0 \leq I_{MCS} \leq 28$, the UE 102 may determine to replace the MCS entries in the first RRC parameter by those reserved MCS indexes. That is, the UE 102 may select an MCS index $I_{MCS}=X$ from the first RRC parameter 704 or 706. In a case that the number of allocated symbols L is different from that indicated by a 'time domain resource assignment' field of a DCI format transported in the latest PDCCH for the same transport block using $0 \leq I_{MCS} \leq 28$, the UE 102 may not determine to replace the MCS entries in the first RRC parameter by those reserved MCS indexes. That is, the UE may select an MCS index $I_{MCS}$=X from the first RRC parameter (e.g. 702).

Additionally or alternatively, even for a retransmission of the transport block indicated by the NDI field, the UE 102 may determine whether to replace some MCS entries in the first RRC parameter by the reserved MCS indexes further based on the 'frequency domain resource assignment' field. For example, in a case that the number of allocated resource blocks $n_{PRB}$ is same with that indicated by a 'frequency domain resource assignment' field of a DCI format transported in the latest PDCCH for the same transport block using $0 \le I_{MCS} \le 28$, the UE 102 may determine to replace the MCS entries in the first RRC parameter by those reserved MCS indexes. That is, the UE 102 may select an MCS index $I_{MCS}$=X from the first RRC parameter 704 or 706. In a case that the number of allocated resource blocks $n_{PR}B$ is different from that indicated by a 'time domain resource assignment' field of a DCI format transported in the latest PDCCH for the same transport block using $0 \le I_{MCS} \le 28$, the UE 102 may not determine to replace the MCS entries in the first RRC parameter by those reserved MCS indexes. That is, the UE may select an MCS index $I_{MCS}$=X from the first RRC parameter (e.g. 702).

Additionally or alternatively, even for a retransmission of the transport block indicated by the NDI field, the UE 102 may determine whether to replace some MCS entries in the first RRC parameter by the reserved MCS indexes further based on the 'frequency domain resource assignment' field and the 'time domain resource assignment' field. For example, in a case that the total number of REs (e.g. $L \times n_{PRB}$) is same with that indicated by a DCI format transported in the latest PDCCH for the same transport block using $0 \le I_{MCS} \le 28$, the UE 102 may determine to replace the MCS entries in the first RRC parameter by those reserved MCS indexes. That is, the UE 102 may select an MCS index $I_{MCS}$=X from the first RRC parameter 704 or 706. In a case that the total number of REs (e.g. $L \times n_{PRB}$) is different from that indicated by a DCI format transported in the latest PDCCH for the same transport block using $0 \le I_{MCS} \le 28$, the UE 102 may not determine to replace the MCS entries in the first RRC parameter by those reserved MCS indexes. That is, the UE may select an MCS index $I_{MCS}$=X from the first RRC parameter (e.g. 702).

Figure 8:
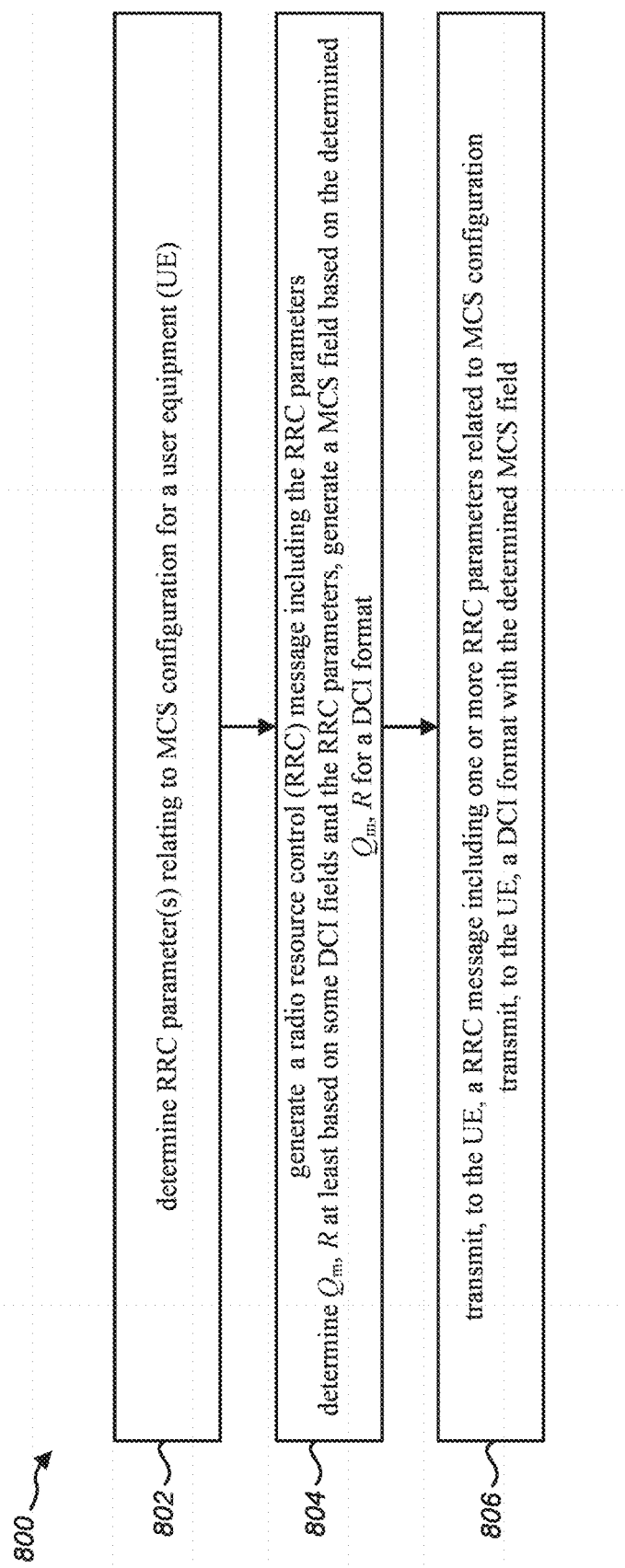
FIG. 8 is a flow diagram illustrating one implementation of a method 800 for determining $Q_m$, R, and TBS by a base station 160.

FIG. 8 is a flow diagram illustrating one implementation of a method 800 for determining $Q_m$, R, and TBS by a base station 160.

The base station 160 may determine 802 a first RRC parameter (e.g. the above-mentioned RRC parameter A or the above-mentioned RRC parameter B). The RRC parameter A may be a list of configured MCS entries. Each entry of MCS may indicate a modulation order $Q_m$, a target code rate R, and a value for spectral efficiency. The base station 160 may determine the MCS entries based on the channel state information reported by the UE 106. The base station 160 may determine the RRC parameter A for the UE 102. The RRC parameter A may be applied to those DCI formats in the above mentioned first DCI format group.

Additionally or alternatively, at 802, the base station 160 may determine the RRC parameter B relating to MCS configuration for the UE 102. The RRC parameter B may indicate a starting MCS index S and MCS index length L. The starting MCS index S is used to indicate the UE 102 where the available MCS index starts in the predefined MCS index table. The MCS index length L is used to indicate the number of available MCS index counting from the starting MCS index Sin the predefined MCS index table.

The base station 160 may generate 804 a RRC message including the first RRC parameter. A RRC message may include system information. The RRC message may be sent on a broadcast control channel (BCCH) logical channel, a common control channel (CCCH) logical channel or a dedicated control channel (DCCH) logical channel.

At 804, the base station 160 may plan to indicate the UE 102 to receive a transport block in a PDSCH or to transmit a transport block in a PUSCH. In this case, the base station 160 may determine a modulation order $Q_m$, a target code rate R used for the transport block in the PDSCH or the PUSCH. In other words, the base station 160 may determine a modulation order $Q_m$, target code rate R, spectral efficiency from a determined MCS index table and then may generate a 'Modulation and coding scheme' field based on the determined modulation order $Q_m$, target code rate R. For those DCI formats in the second DCI format group, the base station 160 may determine (select) a MCS index from the predefined MCS index table and the may generate a 'Modulation and coding scheme' field indicating the determined MCS index. For those DCI formats in the first DCI format group, the base station 160 may determine (select) a MCS index from the first RRC parameter and the may generate a 'Modulation and coding scheme' field indicating the determined MCS index.

The base station 160 may broadcast system information including the RRC parameters related to MCS configuration described above. Alternatively, or additionally, the base station 160 may 806 transmit, to a user equipment (UE), a radio resource control (RRC) message including the RRC parameters related to MCS configuration. At 806, the base station 160 may transmit, to the UE 102, a DCI format including the generated 'Modulation and coding scheme' field in a PDCCH. The UE may upon detection of a PDCCH with the DCI format, may read the 'Modulation and coding scheme' field in the scheduling DCI format to determine the modulation order $Q_m$ and/or the target code rate R.

Figure 9:
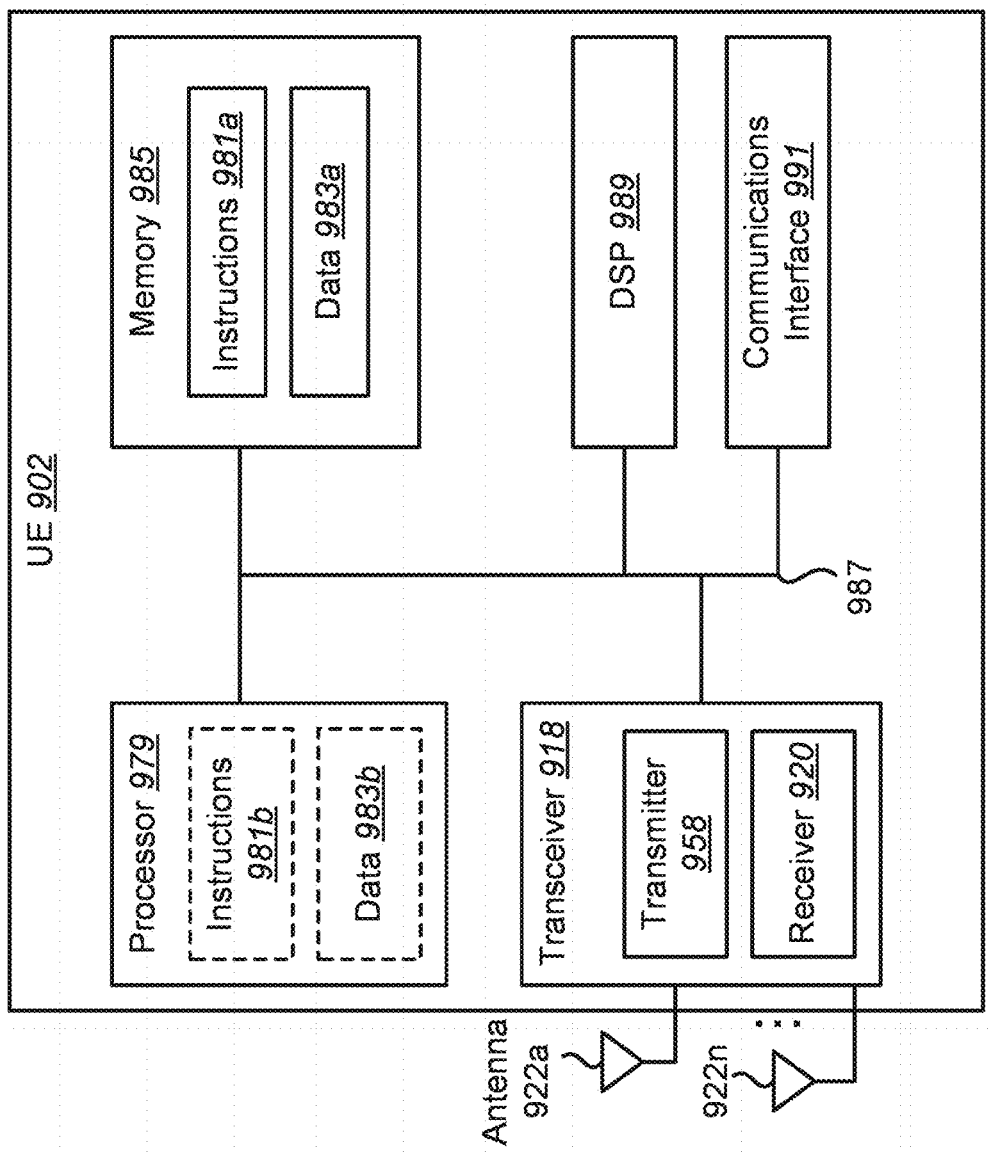
FIG. 9 illustrates various components that may be utilized in a UE.

FIG. 9 illustrates various components that may be utilized in a UE 902. The UE 902 described in connection with FIG. 9 may be implemented in accordance with the UE 102 described in connection with FIG. 1. The UE 902 includes a processor 981 that controls operation of the UE 902. The processor 981 may also be referred to as a central processing unit (CPU). Memory 987, which may include read-only memory (ROM), random access memory (RAM), a combination of the two or any type of device that may store information, provides instructions 983a and data 985a to the processor 981. A portion of the memory 987 may also include non-volatile random access memory (NVRAM). Instructions 983b and data 985b may also reside in the processor 981. Instructions 983b and/or data 985b loaded into the processor 981 may also include instructions 983a and/or data 985a from memory 987 that were loaded for execution or processing by the processor 981. The instructions 983b may be executed by the processor 981 to implement one or more of the methods 200 described above.

The UE 902 may also include a housing that contains one or more transmitters 958 and one or more receivers 920 to allow transmission and reception of data. The transmitter(s) 958 and receiver(s) 920 may be combined into one or more transceivers 918. One or more antennas 922a-n are attached to the housing and electrically coupled to the transceiver 918.

The various components of the UE 902 are coupled together by a bus system 989, which may include a power bus, a control signal bus and a status signal bus, in addition to a data bus. However, for the sake of clarity, the various buses are illustrated in FIG. 9 as the bus system 989. The UE 902 may also include a digital signal processor (DSP) 991 for use in processing signals. The UE 902 may also include a communications interface 993 that provides user access to the functions of the UE 902. The UE 902 illustrated in FIG. 9 is a functional block diagram rather than a listing of specific components.

Figure 10:
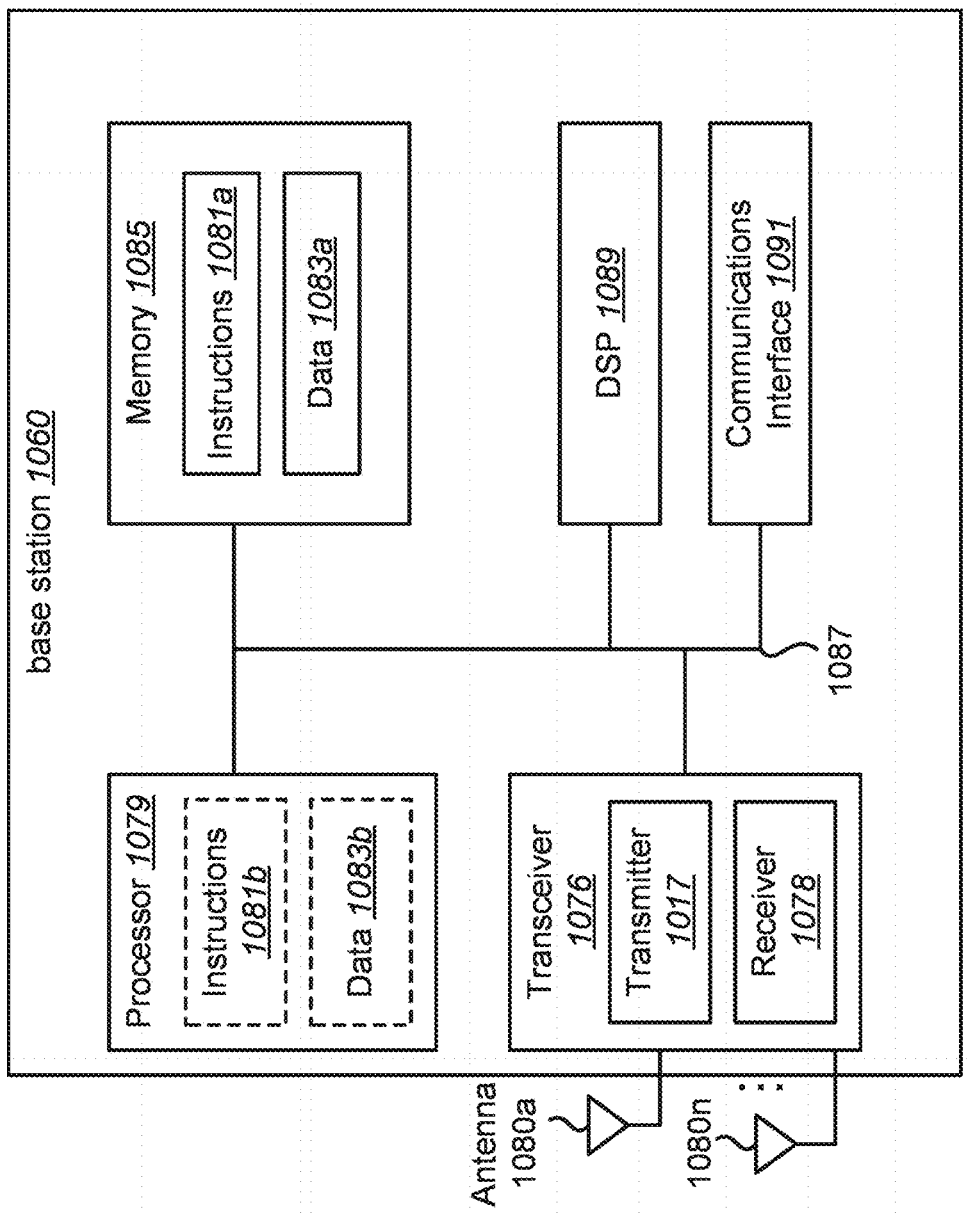
FIG. 10 illustrates various components that may be utilized in a base station.

FIG. 10 illustrates various components that may be utilized in a base station 1060. The base station 1060 described in connection with FIG. 10 may be implemented in accordance with the base station 160 described in connection with FIG. 1. The base station 1060 includes a processor 1081 that controls operation of the base station 1060. The processor 1081 may also be referred to as a central processing unit (CPU). Memory 1087, which may include read-only memory (ROM), random access memory (RAM), a combination of the two or any type of device that may store information, provides instructions 1083a and data 1085a to the processor 1081. A portion of the memory 1087 may also include non-volatile random access memory (NVRAM). Instructions 1083b and data 1085b may also reside in the processor 1081. Instructions 1083b and/or data 1085b loaded into the processor 1081 may also include instructions 1083a and/or data 1085a from memory 1087 that were loaded for execution or processing by the processor 1081. The instructions 1083b may be executed by the processor 1081 to implement one or more of the methods 300 described above.

The base station 1060 may also include a housing that contains one or more transmitters 1017 and one or more receivers 1078 to allow transmission and reception of data. The transmitter(s) 1017 and receiver(s) 1078 may be combined into one or more transceivers 1076. One or more antennas 1080a-n are attached to the housing and electrically coupled to the transceiver 1076.

The various components of the base station 1060 are coupled together by a bus system 1089, which may include a power bus, a control signal bus and a status signal bus, in addition to a data bus. However, for the sake of clarity, the various buses are illustrated in FIG. 10 as the bus system 1089. The base station 1060 may also include a digital signal processor (DSP) 1091 for use in processing signals. The base station 1060 may also include a communications interface 1093 that provides user access to the functions of the base station 1060. The base station 1060 illustrated in FIG. 10 is a functional block diagram rather than a listing of specific components.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using circuitry, a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods and apparatus described herein without departing from the scope of the claims.

The invention claimed is:

1. A user equipment (UE), comprising:
reception circuitry configured to receive, from a base station, on a physical downlink shared channel (PDSCH), a system information block 1 (SIB1), the SIB1 being a cell-specific system information block, and
receive, on a physical downlink control channel (PDCCH), a first downlink control information (DCI) format with a cyclic redundancy check (CRC) scrambled by a first radio network temporary identifier (RNTI), the first DCI format being used for scheduling of a transmission of a physical uplink shared channel (PUSCH) and including a modulation and coding scheme (MCS) field; and
control circuitry configured to determine that:
in a case that the SIB1 includes a first radio resource control (RRC) parameter indicating multiple MCS configurations, one MCS configuration is determined from the multiple MCS configurations based on the MCS field and is used for the PUSCH, and
in a case that the first RRC parameter is absent in the SIB1, one MCS configuration is determined from a predefined MCS table based on the MCS field and is used for the PUSCH, the predetermined MCS table known to the UE,
wherein a number of bit(s) in the MCS field, being used to determine the one MCS configuration, is equal to ceil(log 2(I)), the I is a total number of the multiple MCS configurations, and
ceil(x) is a function that takes as an input a real number x and gives as an output a least integer greater than or equal to x, where x is equal to (log 2(I).

2. The UE according to claim 1:
each of the multiple MCS configurations corresponds to an MCS index and indicates a modulation order and a target code rate used for a transport block (TB) in the PUSCH.

3. The UE according to claim 2:
the control circuitry is further configured to determine a modulation order and a target code rate used for the TB in the PUSCH at least based on the MCS field and one, a part, or all of a plurality of specified DCI fields other than the MCS field, wherein the specified DCI fields include one, a part, or all of a HARQ process number field, a new data indicator (NDI) field, a time domain resource assignment field, and a frequency domain resource assignment field.

4. The UE according to claim 3:
in a first case that the PUSCH is determined as an initial transmission of the TB based on the NDI field of the first DCI format, the modulation order and the target code rate are determined as X-th MCS configuration in the first RRC parameter, the determined code rate is at least used to determine the transport block size for the TB,
in a second case that the PUSCH is determined as a retransmission of the TB based on the NDI field of the first DCI format, the modulation order is determined as X-th MCS configuration in the first RRC parameter, the target code rate provided in the X-th MCS configuration is not used for the TB in the PUSCH,
wherein the value of X is indicated by the MCS field.

5. A base station, comprising:
transmission circuitry configured to transmit, to a user equipment (UE), on a physical downlink shared channel (PDSCH), a system information block 1 (SIB1), the SIB1 being a cell-specific system information block, and
transmit, on a physical downlink control channel (PDCCH), a first downlink control information (DCI) format with a cyclic redundancy check (CRC) scrambled by a first radio network temporary identifier (RNTI), the first DCI format being used for scheduling of a transmission of a physical uplink shared channel (PUSCH) and including a modulation and coding scheme (MCS) field; and
control circuitry configured to determine that:
in a case that the SIB1 includes a first radio resource control (RRC) parameter indicating multiple MCS configurations, one MCS configuration is determined from the multiple MCS configurations based on the MCS field and used for the PUSCH, and
in a case that the first RRC parameter is absent in the SIB1, one MCS configuration is determined from a predefined MCS table based on the MCS field and is used for the PUSCH, the predetermined MCS table known to the UE,
generate a value of the MCS field based on the determined MCS configuration used for the PUSCH,
wherein a number of bit(s) in the MCS field, being used to determine the one MCS configuration, is equal to ceil (log 2(I)), the I is a total number of the multiple MCS configurations, and
ceil(x) is a function that takes as an input a real number x and gives as an output a least integer greater than or equal to x, where x is equal to (log 2(I)).

6. The base station according to claim 5:
each of the multiple MCS configurations corresponds to an MCS index and indicates a modulation order and a target code rate used for a transport block (TB) in the PUSCH.

7. The base station according to claim 6:
the control circuitry is further configured to determine a modulation order and a target code rate used for the TB in the PUSCH at least based on the first RRC parameter and one, a part, or all of a plurality of specified DCI fields other than the MCS field, generate the MCS field with an MCS index indicating the determined modulation order and the target code rate, wherein the specified DCI fields include one, a part, or all of a HARQ process number field, a new data indicator (NDI) field, a time domain resource assignment field, and a frequency domain resource assignment field.

8. The base station according to claim 7:
in a first case that the PUSCH is determined as an initial transmission of the TB based on the NDI field of the first DCI format, the modulation order and the target code rate are determined as X-th MCS configuration in the first RRC parameter, the determined code rate is at least used to determine the transport block size for the TB,
in a second case that the PUSCH is determined as a retransmission of the TB based on the NDI field of the first DCI format, the modulation order is determined as X-th MCS configuration in the first RRC parameter, the target code rate provided in the X-th MCS configuration is not used for the TB in the PUSCH,
wherein the value of X is indicated by the MCS field.

9. A method by a user equipment (UE), comprising:
receiving, from a base station, on a physical downlink shared channel (PDSCH), a system information block 1 (SIB1), the SIB1 being a cell-specific system information block, and
receive, on a physical downlink control channel (PDCCH), a first downlink control information (DCI) format with a cyclic redundancy check (CRC) scrambled by a first radio network temporary identifier (RNTI), the first DCI format being used for scheduling of a transmission of a physical uplink shared channel (PUSCH) and including a modulation and coding scheme (MCS) field;
determining that:
in a case that the SIB1 includes a first radio resource control (RRC) parameter indicating multiple MCS configurations, one MCS configuration is determined from the multiple MCS configurations based on the MCS field and is used for the PUSCH, and
in a case that the first RRC parameter is absent in the SIB1, one MCS configuration is determined from a predefined MCS table based on the MCS field and is used for the PUSCH, the predetermined MCS table known to the UE,
wherein a number of bit(s) in the MCS field, being used to determine the one MCS configuration, is equal to ceil (log 2(I)), the I is a total number of the multiple MCS configurations, and
ceil(x) is a function that takes as an input a real number x and gives as an output a least integer greater than or equal to x, where x is equal to (log 2(I)).

* * * * *